United States Patent
Kitahara et al.

(12)
(10) Patent No.: US 6,277,929 B1
(45) Date of Patent: Aug. 21, 2001

(54) POLYMERIZABLE UNSATURATED COMPOUNDS, CURABLE RESIN COMPOSITIONS CONTAINING THE SAME, AND PRODUCTS OF CURING THEREOF

(75) Inventors: Shizuo Kitahara, Kawaguchi; Ichiro Kawabuchi, Yokohama; Hiroshi Hayashi, Fujisawa, all of (JP)

(73) Assignee: Vantico Inc., Brewster, NY (US)

( * ) Notice: Subject to any disclaimer, the term of this patent is extended or adjusted under 35 U.S.C. 154(b) by 0 days.

(21) Appl. No.: 09/380,449

(22) PCT Filed: Mar. 7, 1997

(86) PCT No.: PCT/JP97/00721

§ 371 Date: Jan. 27, 2000

§ 102(e) Date: Jan. 27, 2000

(87) PCT Pub. No.: WO98/39375

PCT Pub. Date: Sep. 11, 1998

(51) Int. Cl.[7] ............................. C08F 20/00; C08G 63/48
(52) U.S. Cl. ...................... 525/440; 528/295.5; 528/302; 528/306; 528/308; 525/437; 525/444; 522/6
(58) Field of Search ................... 528/295.5, 302, 528/306, 308; 525/437, 440, 444; 522/6

(56) References Cited

U.S. PATENT DOCUMENTS

| 4,447,563 | 5/1984 | Kanaoka et al. | 523/176 |
| 6,001,915 | * 12/1999 | Schwarte et al. | 524/457 |

OTHER PUBLICATIONS

Abstract for JP 7–216073 no date.
Abstract for JP 6–298893 no date.
Abstract for JP 8–269153 no date.
Chem. Abstr. 105:44898 for JP 61021120 no date.
Derwent Abstract 90–344628/46 for JP 2248414 no date.
Derwent Abstract 95–390319/50 for JP 07268046 no date.
McMahon et al., J. Am. Oil Chem. Soc. 1974, 51, pp. 522–527 no date.
JIS, K 7301–1985, pp. 1–20 no date.
JIS, K 6253:1997, pp. 1–22 no date.

* cited by examiner

Primary Examiner—Samuel A. Acquah
(74) Attorney, Agent, or Firm—Kristin H. Neuman; James H. Shalek; Lyon & Lyon, LLP

(57) ABSTRACT

An unsaturated polyester (i) having a weight-average molecular weight (Mw) of 1,000–100,000 and at least two carbon-carbon unsaturated bonds in the molecule thereof obtained by esterifying an unsaturated carboxylic acid (b) with a polyester-polyol (a) obtained by subjecting a polybasic carboxylic acid containing polymerized fatty acid and/or polymerize fatty acid ester to polycondensation with a polyhydric alcohol; and an unsaturated (poly)urethane having Mw of 1,000–100,000 and at least two carbon-carbon unsaturated bonds in molecule obtained by reacting said polyester-polyol (a), polyisocyanate (d) and compound (e) having active hydrogen and polymerizable carbon-carbon unsaturated bond. Said unsaturated polyester and unsaturated (poly)urethane exhibit excellent adhesive property, heat resistance, water resistance and flexibility after being cured.

19 Claims, 2 Drawing Sheets

POLYMERIZABLE UNSATURATED COMPOUNDS, CURABLE RESIN COMPOSITIONS CONTAINING THE SAME, AND PRODUCTS OF CURING THEREOF

The present invention relates to a polymerizable unsaturated compound exhibiting, after being cured, excellent adhesive property, heat resistance, water resistance and flexibility, and to a method for production thereof.

The invention further relates to a curable resin composition comprising said polymerizable unsaturated compound and a diluent, and a molded article obtained by curing said curable resin composition.

Curable resin compositions such as UV-curable resin composition and the like are characterized in that they have a high drying velocity and do not pollute the working environment. Thus, the curable resin compositions are used in many fields including coating materials, inks, adhesives, etc. Recently, the demand of (meth)acrylate type curable resin compositions is increasing as casting type gasket, sealing material and coating material, and the requirement for their quality is becoming more and more severe. In cases of gasket and sealing material, flexibility and adhesiveness are required from the viewpoint of tightness of bonding to substrate and, in addition, high durabilities such as water resistance and heat resistance are severely demanded under high-temperature, high-humidity conditions.

As prior acrylate type curable resin composition, for instance, a curable resin composition comprising a polymerizable unsaturated polybutadiene obtainable by reacting a polybutadiene-polyol/polyisocyanate/hydroxyalkyl acrylate system is disclosed in JP-A-Sho 58(1983)-76414 and JP-A-Sho 61(1986)-21120. Although the cured articles obtained from such a composition containing polymerizable unsaturated polybutadiene are excellent in flexibility and water resistance, they are inferior in adhesiveness and heat resistance. In "UV, EB-Curable Materials" (published by CMC Corp.), p.74, (1992), there is disclosed a curable resin composition comprising a polymerizable unsaturated polyurethane prepared by subjecting a dicarboxylic acid such as adipic acid, succinic acid, terephthalic acid, isophthalic acid or the like to a polycondensation with a glycol such as ethylene glycol, diethylene glycol, neopentyl glycol, 1,4-butanediol or the like to form a polyester-polyol and then reacting the polyester-polyol with a polyisocyanate and a hydroxyalkyl acrylate. Although cured articles of this composition comprising a polymerizable unsaturated polyurethane have a high heat resistance, they are inferior in flexibility, adhesiveness and water resistance. Further, in JP-A-Hei 2(1990)-248414, there is disclosed a curable resin composition comprising a polymerizable unsaturated polyester prepared by subjecting adipic acid to a polycondensation with 2-butyl-2-ethyl-1,3-propanediol to obtain a polyester-polyol and then esterifying the polyester-polyol with acrylic acid. Although cured article of this composition comprising the polymerizable unsaturated polyester is improved in heat resistance, it is inferior in adhesiveness, water resistance and flexibility.

It is an object of the present invention to provide a polymerizable unsaturated compound giving, after cure, a material superior in adhesion to substrate and excellent in heat resistance, water resistance and flexibility.

It is another object of the present invention to provide a curable resin composition comprising a polymerizable unsaturated compound and a diluent and excellent in adhesiveness, water resistance, heat resistance and flexibility.

It is a yet another object of the present invention to provide a molded article excellent in air-tightness and durability under high-temperature and high-humidity conditions which can be obtained by curing a curable resin composition.

The present inventors conducted extensive studies with the aim of overcoming the problems of prior art. As a result, it was found that a curable resin composition superior in adhesiveness to substrate and excellent in flexibility, heat resistance and water resistance can be obtained by using, as a polymerizable unsaturated ingredient, (1) a polymerizable unsaturated polyester obtained by subjecting polymerized fatty acid-containing polybasic carboxylic acid to a polycondensation with a polyhydric alcohol to prepare a polyester-polyol and then esterifying the polyester-polyol with an unsaturated carboxylic acid and/or (2) an unsaturated (poly)urethane obtained by reacting said polymerized fatty acid-containing polyester-polyol with a polyisocyanate and an active hydrogen-containing polymerizable unsaturated compound. Further, it was also found that molded articles such as gasket and the like obtained by curing said curable resin composition are quite superior in air tightness and durability under high-temperature and high-humidity conditions. Based on these findings, the present invention was accomplished.

According to the present invention, there is provided an unsaturated polyester (i) having a weight-average molecular weight of 1,000–100,000 and at least two polymerizable carbon-carbon unsaturated bonds in the molecule thereof, said unsaturated polyester (i) being obtained by subjecting a polybasic carboxylic acid component containing at least one member selected from the group consisting of polymerized fatty acid and polymerized fatty acid ester to a polycondensation reaction with a polyhydric alcohol to prepare a polyester-polyol (a), followed by esterifying (a) with an unsaturated carboxylic acid (b) having a polymerizable carbon-carbon unsaturated bond in the molecule thereof.

Further, according to the present invention, there is provided a method for producing said unsaturated polyester (i) characterized by subjecting a polybasic carboxylic acid component containing at least one member selected from the group consisting of polymerized fatty acid and polymerized fatty acid ester to a polycondensation reaction with a polyhydric alcohol to prepare a polyester-polyol (a), followed by reacting (a) with an unsaturated carboxylic acid (b) having a polymerizable carbon-carbon unsaturated bond in the molecule thereof.

Further, according to the present invention, there is provided an unsaturated (poly)urethane (ii) having a weight-average molecular weight (Mw) of 1,000–100,000 and at least two polymerizable carbon-carbon unsaturated bonds in the molecule thereof, said unsaturated (poly)urethane (ii) being obtained by subjecting a polybasic carboxylic acid component containing at least one member selected from the group consisting of polymerized fatty acid and polymerized fatty acid ester to a polycondensation reaction with a polyhydric alcohol to prepare a polyester-polyol (c), followed by reacting (c) with a polyisocyanate (d) and at least one active hydrogen-containing polymerizable unsaturated compound (e) selected from the group consisting of acrylic acid, methacrylic acid, acrylamide, methacrylamide, active hydrogen-containing acrylic esters, active hydrogen-containing methacrylic esters and active hydrogen-containing styrenes represented by the following general formula (8):

$$CH_2=CR^{10}-B-X \qquad (8)$$

wherein $R^{10}$ is hydrogen atom or alkyl group, B is phenylene group and X is hydroxyl group, amino group or carboxyl group.

Further, according to the present invention, there is provided a method for producing the unsaturated (poly)urethane (ii) characterized by subjecting a polybasic carboxylic acid component containing at least one member selected from the group consisting of polymerized fatty acid and polymerized fatty acid ester to a polycondensation reaction with a polyhydric alcohol to prepare a polyester-polyol (c), followed by reacting the polyester-polyol (c) with a polyisocyanate (d) and the above-mentioned active hydrogen-containing polymerizable unsaturated compound Further, according to the present invention, there is provided a method for producing the unsaturated (poly)urethane (ii) characterized by subjecting a polybasic carboxylic acid component containing at least one member selected from the group consisting of polymerized fatty acid and polymerized fatty acid ester to a polycondensation reaction with a polyhydric alcohol to prepare a polyester-polyol (c), followed by reacting the polyester-polyol (c) with a polyisocyanate (d) to prepare a (poly)urethane compound (t) having at least two isocyanato groups and then reacting the isocyanato group-containing (poly)urethane compound (f) with the above-mentioned active hydrogen-containing polymerizable unsaturated compound. Further, according to the present invention, there is provided a method for producing the unsaturated (poly)urethane (ii) characterized by reacting a polyisocyanate (d) with the above-mentioned active hydrogen-containing polymerizable unsaturated compound to prepare an isocyanato group-containing (poly)urethane compound (g), followed by reacting said isocyanato group-containing (poly)urethane compound (g) with a polyester-polyol (c) obtained by subjecting a polybasic carboxylic acid component containing at least one member selected from the group consisting of polymerized fatty acid and polymerized fatty acid ester to a polycondensation with a polyhydric alcohol.

Further, according to the present invention, there is provided a curable resin composition comprising a polymerizable unsaturated compound (h) having in the molecule thereof at least two polymerizable carbon-carbon unsaturated groups and a diluent (j), said polymerizable unsaturated compound (h) comprising at least one member selected from the group consisting of said unsaturated polyester (i) and said unsaturated (poly)urethane (ii).

Further, according to the present invention, there is provided a molded article obtained by curing said curable resin composition.

Figure 1:
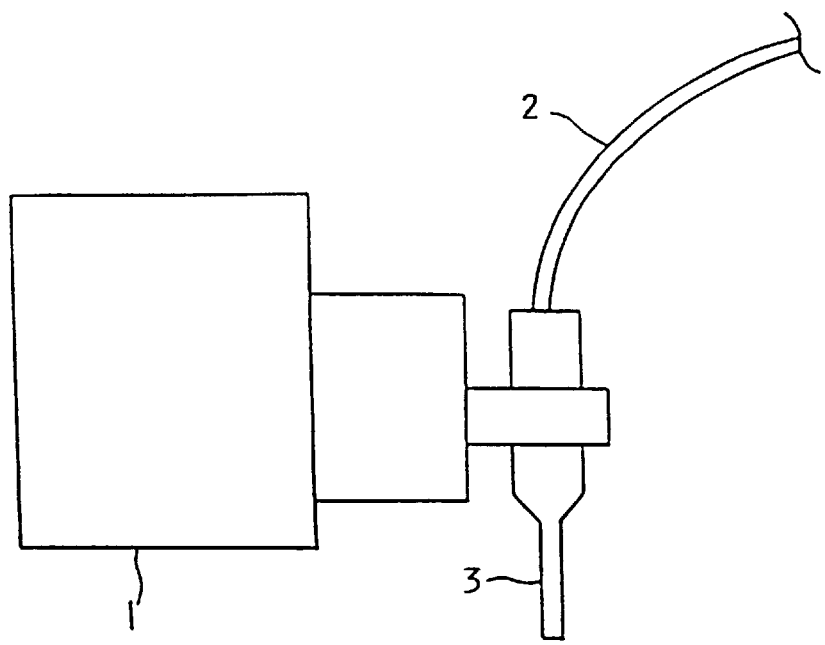
FIG. 1 is an outlined view illustrating one embodiment of the discharging-curing apparatus used for curing the curable resin composition of the present invention to produce a molded article of the present invention.

Next, details of the present invention will be mentioned below.

Unsaturated Polyester (i)

The unsaturated polyester (i) of the present invention is an unsaturated polyester having in the molecule thereof at least two polymerizable carbon-carbon unsaturated bonds obtained by subjecting a polybasic acid component containing polymerized fatty acid and/or polymerized fatty acid ester to a polycondensation reaction with a polyhydric alcohol to obtain a polyester-polyol (a), followed by esterifying the polyester-polyol (a) with an unsaturated carboxylic acid (b) having in the molecule thereof a polymerizable carbon-carbon unsaturation.

As said polymerized fatty acid, those used in the conventional polyester syntheses can be used without restriction. Although polymerized fatty acids prepared by polymerizing fatty acid or fatty acid ester according to known processes are usually used, a polybasic polymerized fatty acid prepared by polymerizing a higher fatty acid or a higher fatty acid ester is preferable because it is high in all of adhesiveness, flexibility, water resistance and heat resistance and these properties are well balanced. The fatty acid may be any of saturated and unsaturated fatty acids, and the number of carbon atoms is usually 8 to 30, preferably 12 to 24, and further preferably 16 to 20. As the fatty acid ester, alkyl esters, such as methyl, ethyl, propyl, butyl, amyl and cyclohexyl esters and the like, of higher fatty acids are used usually.

Preferable polymerized fatty acids include polymerized products of unsaturated higher fatty acids such as oleic acid, linoleic acid, recinoleic acid, elaeostearic acid and the like, polymerized products of tall oil fatty acid, beef tallow fatty acid and the like, etc. can be referred to. Products prepared by hydrogenating the carbon-carbon unsaturated bond remaining in the polymerized fatty acids can also be used. The structure of the polymerized fatty acid was analyzed and reported by D. H. McMahon et al. (J. Am. Oil Chem. Soc., 51, 522 (1974)). Proportions of the dibasic carboxylic acid (hereinafter referred to as "dimer acid") and tri- or higher-basic carboxylic acid in the polymerized fatty acid is not particularly limited, but the proportions may be appropriately selected in accordance to the object of use. Usually, polymerized fatty acids composed mainly of dimer acid are used, and proportion of dimer acid in the polymerized fatty acid is usually 40% by weight or more, preferably 50–100% by weight, further preferably 70–100% by weight, and most preferably 90–100% by weight. As the tri- or higher-basic carboxylic acid (carboxylic acids having a basicity of 3 or above) in the polymerized fatty acid, tribasic carboxylic acid (hereinafter referred to as "trimer acid") and tetra- or higher-basic carboxylic acids are used, among which trimer acid is preferable.

Although the polymerized fatty acid ester is not particularly limited, alkyl esters of the above-mentioned polymerized fatty acids are usually used as the polymerized fatty acid ester. As said alkyl ester, lower alkyl esters such as methyl ester, ethyl ester, propyl ester, isopropyl ester, butyl ester, amyl ester, hexyl ester and the like and higher alkyl esters such as octyl ester, decyl ester, dodecyl ester, pentadecyl ester, octadecyl ester and the like can be referred to, among which preferable are lower alkyl esters and further preferable are methyl ester, ethyl ester, propyl ester and butyl ester.

These polymerized fatty acids and polymerized fatty acid esters can be used either alone or in combination of two or more. Although proportion of the sum of the polymerized fatty acids and the polymerized fatty acid esters in the total polybasic carboxylic acid is not particularly limited, proportion of the sum of polymerized fatty acid and polymerized fatty acid ester is usually 30% by weight or more, preferably 50% by weight or more, further preferably 70% by weight or more and most preferably 90% by weight or more based on the total polybasic carboxylic acid. If a polybasic carboxylic acid component containing neither polymerized fatty acid nor polymerized fatty acid ester is used, adhesiveness, water resistance, heat resistance and flexibility are all bad.

The residual portion of the polyhydric carboxylic acid component other than the polymerized fatty acid and polymerized fatty acid ester is not particularly limited. As such residual portion, other dibasic carboxylic acids, other dibasic carboxylic acid esters, other tri- or higher-basic carboxylic acids and other tri- or higher-basic carboxylic acid esters may be used, among which other dibasic carboxylic acids and other dibasic carboxylic acid esters are preferable.

Examples of said "other dibasic carboxylic acid" include succinic acid, glutaric acid, adipic acid, maleic acid, itaconic acid, pimelic acid, methylmalonic acid, dimethylmalonic acid, suberic acid, azelaic acid, terephthalic acid, isophthalic acid, methylisophthalic acid, sebacic acid, brassylic acid, polyalkylenesuccinic acid and the like. Among these acids, preferable are higher dibasic carboxylic acids such as suberic acid, azelaic acid, terephthalic acid, isophthalic acid, methylisophthalic acid, sebacic acid, brassylic acid, polyalkylenesuccinic acid and the like.

The "other tri- or higher-basic carboxylic acids" are not limited, so far as they have three or more carboxylic groups in one molecule. Concrete examples thereof include trimellitic acid, tricarballylic acid, camphoronic acid, trimesic acid and the like.

Although said "other dibasic carboxylic acid ester" and said "other tri- or higher-basic carboxylic acid ester" are not particularly limited, alkyl esters of the above-mentioned other dibasic carboxylic acids and other tri- or higher-basic carboxylic acids are used usually. The alkyl esters include lower alkyl ester such as methyl ester, ethyl ester, propyl ester, isopropyl ester, butyl ester, amyl ester, hexyl ester and the like and higher alkyl esters such as octyl ester, decyl ester, dodecyl ester, pentadecyl ester, octadecyl ester and the like, among which lower alkyl esters are preferable, and methyl ester, ethyl ester, propyl ester and butyl ester are further preferable.

These polybasic carboxylic acids and polybasic carboxylic acid esters constituting the residual portion may be used either alone or in combination of two or more. If the residual portion is divided into [A] which is other dibasic carboxylic acids and/or other dibasic carboxylic acid esters and [B] which is other tri- or higher-basic carboxylic acids and other tri- or higher-basic carboxylic acid esters, the ratio of [A] to [B] may be appropriately decided in accordance with the purpose of use and is not particularly limited. However, the ratio [A]:[B] is usually from 50:50 to 100:0, preferably from 70:30 to 100:0, and further preferably from 90:10 to 100:0 as expressed in terms of ratio by weight, based on the total polybasic carboxylic acids from which polymerized fatty acid and polymerized fatty acid ester have been excepted.

Monobasic carboxylic acids such as formic acid, acetic acid, butyric acid, 2-methylpropanoic acid, valeric acid, isooctylic acid, isononanoic acid, lauric acid, myristic acid, palmitic acid, stearic acid, isostearic acid, arachidonic acid, linoleic acid, oleic acid, elaidic acid and the like and ester derivatives of these mono-carboxylic acids may also be used in combination with the above, so far as their use exercises no adverse influence upon the effect of the present invention. The monocarboxylic acids and monocarboxylic acid esters may be used in an amount of 20% by weight or less, preferably 10% by weight or less, and further preferably 5% by weight or less based on the total polybasic carboxylic acid component.

As the polyhydric alcohol, any polyhydric alcohols may be used without restriction, so far as they can be used in the conventional polyester syntheses. For instance, dihydric alcohols and mixtures of dihydric alcohols and tri- or higher-hydric alcohols can be used for this purpose, among which dihydric alcohols are preferable.

Examples of the dihydric alcohol include alkanediols, cycloalkanediols, aromatic diols, oligo-oxyalkylene glycols, polyoxyalkylene glycols, hindered glycols and the like, among which alkanediols, cycloalkane-diols and hindered glycols are preferable.

Concrete examples of said alkanediol include ethylene glycol, propylene glycol, 1,2-butanediol, 1,4-butanediol, 1,6-hexanediol, 3-methyl-1,5-pentanediol, 1,8-octanediol, 1,9-nonanediol and the like, among which preferable are alkanediols having 4 to 9 carbon atoms such as 1,4-butanediol, 1,6-hexanediol, 3-methyl-1,5-pentanediol, 1,8-octanediol, 1,9-nonanediol and the like.

Concrete examples of said cycloalkanediol include cyclopentane-1,2-diol, cyclohexane-1,2-diol, cyclohexane-1,3-diol, cyclohexane-1,4-diol, cyclooctane-1,4-diol, 2,5-norbornanediol and the like.

Concrete examples of said aromatic diol include p-xylenediol, 4,4'-methylenediphenol, 4,4'-dihydroxybiphenyl, 2,5-naphthalenediol and the like.

As said oligo-oxyalkylene glycol and said polyoxyalkylene glycol, for instance, products obtained by polymerizing a single member or a mixture of alkylene oxides such as ethylene oxide, propylene oxide, butylene oxide and the like according to the known processes can be used. The products thus obtained can be expressed, for instance, by the following general formula (1):

$$HO-((CH_2)_a-CHR^1O)_b-H \qquad (1)$$

wherein $R^1$ represents hydrogen atom or a lower alkyl group such as methyl, ethyl or the like and preferably hydrogen atom or methyl group, "a" represents an integer of 1–6 and preferably 1–4, and b represents an integer of 2–100, preferably 2–50 and further preferably 2–25. Concrete examples thereof include oligo-oxyalkylene glycols such as diethylene glycol, triethylene glycol, tetraethylene glycol, dipropylene glycol, tripropylene glycol and the like; and polyoxyalkylene glycols such as polyethylene glycol, polypropylene glycol, polyethylene-propylene glycol, polybutylene glycol and the like.

The hindered glycols are represented by, for instance, the following general formula (2):

$$HOCH_2-C(R^2R^3)-CH_2OH \qquad (2)$$

wherein $R^2$ and $R^3$ independently represents an alkyl group. Although the number of carbon atoms per alkyl group is not particularly limited, it is usually 1–50, preferably 1–20, and further preferably 2–10. Concrete examples of the alkyl group include methyl, ethyl, propyl, isopropyl, butyl, isobutyl, sec-butyl, amyl, hexyl, heptyl, octyl, nonyl, decyl, dodecyl, tridecyl, pentadecyl, octadecyl, eicosyl and the like. Among these alkyl groups, preferable are methyl, ethyl, propyl, isopropyl, butyl, isobutyl, sec-butyl, amyl, hexyl, heptyl, octyl, nonyl, decyl and the like, and especially preferable are ethyl, propyl, butyl, amyl, hexyl, heptyl, octyl, nonyl and decyl.

Concrete examples of the hindered glycol include 2,2-dimethyl-1,3-propanediol, 2,2-diethyl-1,3-propanediol, 2,2- dipropyl-1,3-propanediol, 2,2-diisopropyl-1,3-propanediol, 2,2-dibutyl-1,3-propanediol, 2,2-diisobutyl-1,3-propanediol, 2-methyl-2-dodecyl-1,3-propanediol, 2-ethyl-2-butyl-1,3-propanediol, 2-propyl-2-pentyl-1,3-propanediol and the like, among which preferable are 2,2-diethyl-1,3-propanediol, 2,2-dipropyl-1,3-propanediol, 2,2-dibutyl-1,3-propanediol, 2-ethyl-2-butyl-1,3-propanediol and 2-propyl-2-pentyl-1,3-propanediol.

As the tri- or higher-hydric alcohol, any alcohols may be used without limitation so far as they have three or more hydroxyl groups. For instance, glycerol compounds such as glycerol, polyglycerol and the like, sugars such as sorbitol, glucose, mannitol, sucrose, glucose and the like, dimethylolpropane, dipentaerythritol, and the like can be used for this purpose.

As the tri- or higher-hydric alcohol, hindered alcohols having a basicity of 3 or above represented by the following general formula (3):

$$HOCH_2—C(R^4R^5)—CH_2OH \quad (3)$$

can be used. In this formula, $R^4$ and $R^5$ independently represents an alkyl group or a hydroxyl group-containing alkyl group, provided that at least one of $R^4$ and $R^5$ is hydroxyl group-containing alkyl group. Herein, the number of carbon atoms constituting the alkyl group is not particularly limited, but it is usually 1–50, preferably 1–20 and further preferably 2–10. Examples of such tri- or higher-hydric hindered alcohol include trimethylolethane, trimethylolpropane, trimethylolbutane, pentaerythritol and the like.

These polyhydric alcohol components can be used either alone or in combination of two or more.

When the polyhydric alcohol components used in the present invention contains the above-mentioned hindered glycol, the invention exhibits a synergistically enhanced water resistance. Although proportion of the hindered glycol in the polyhydric alcohol component may be appropriately decided in accordance with the purpose of use, it is usually 30% by weight or more, preferably 50% by weight or more and further preferably 70% by weight or more based on the total polyhydric alcohol component. As the residual portion of the polyhydric alcohol component, dihydric alcohols and/or tri- or higher-hydric alcohols other than the above-mentioned hindered glycols may be used without limitation, among which preferable are dihydric alcohols and further preferable are alkylene glycols.

In the present invention, monohydric alcohols may be used as a part of the above-mentioned polyhydric alcohol component, if desired, so far as their use exercises no adverse influence upon the effect of the present invention. Examples of the monohydric alcohol include methanol, ethanol, isopropanol, butanol, t-butanol, neopentyl alcohol, 3-methyl-3-pentanol, 3-ethyl-3-pentanol, 2,3,3-trimethyl-2-butanol, 1-decanol, nonyl alcohol and the like. Allowable upper limit of the quantity of the monohydric alcohols is usually 20% by weight or less, preferably 15% by weight or less and further preferably 10% by weight or less based on the total polyhydric alcohol component.

Although the ratio of the total polybasic carboxylic acid component to the total polyhydric alcohol component may be appropriately decided in accordance with desired molecular weight and hydroxyl value of the polyester to be prepared, the ratio expressed in terms of OH/COOH ratio (by equivalent) is usually 1.05–5, preferably 1.1–3, and further preferably 1.2–2.

The polycondensation reaction may be carried out according to the conventional method. For instance, the reaction is carried out at a temperature of 100–300° C., preferably 150–280° C., especially in the presence of an inert gas. If desired, a water-insoluble organic solvent such as toluene, xylene and the like which can make an azeotropic mixture with water may be used, and the reaction may be carried out under a reduced pressure. For making progress an esterifying polycondensation reaction, an esterifying catalyst is used usually. Examples of the esterifying catalyst include Brønsted acid such as p-toluenesulfonic acid, sulfuric acid, phosphoric acid and the like, Lewis acid such as boron trifluoride complexes, titanium tetrachloride, tin tetrachloride and the like, and organic metal compounds such as zinc stearate, alkyltin oxide, titanium alkoxide and the like. From the viewpoint of stability of resulting polyester to oxidation, organometallic compounds of Group IV elements of the periodic table are preferable.

Molecular weight of the polyester-polyol (a) thus obtained is not limited particularly. However, especially excellent water resistance and flexibility can be exhibited when the weight-average molecular weight (Mw) of the polyester-polyol, converted to that of standard polyester, is usually 1,000–100,000, preferably 1,500–50,000, and further preferably 2,000–20,000.

Although hydroxyl value of the polyester-polyol (a) used in the present invention is not particularly limited, it is usually 3–200 mgKOH/g, preferably 5–150 mgKOH/g and further preferably 10–120 mgKOH/g.

The unsaturated carboxylic acid (b) used in the present invention is a compound having at least one polymerizable carbon-carbon unsaturated bond and at least one carboxyl group in the molecule thereof. Although said polymerized carbon-carbon unsaturated bond is not particularly limited so far as it is a carbon-carbon unsaturated bond taking part in a polymerization reaction initiated by heat or a variety of polymerization initiators, it is preferably a vinyl bond, a vinylidene bond or the like.

Examples of the unsaturated carboxylic acid (b) include monobasic unsaturated carboxylic acids such as acrylic acid, methacrylic acid, crotonic acid, p-carboxy-styrene and the like; dibasic unsaturated carboxylic acids such as maleic acid, fumaric acid, citraconic acid, itaconic acid, glutaric acid, 3-methyl-2-pentendioic acid, 2-methyl-2-pentendioic acid and the like; etc. Among these acids, monobasic unsaturated carboxylic acids are preferable, and acrylic acid and methacrylic acid are especially preferable.

These unsaturated carboxylic acids (b) may be used either alone or in combination of two or more acids. The quantity of the unsaturated carboxylic acid (b) is appropriately decided so as to give at least two polymerizable carbon-carbon unsaturated bonds to the resulting unsaturated polyester. Thus, the quantity of the unsaturated carboxylic acid (b) is usually 0.8–5 equivalents, preferably 0.9–3 equivalents, and further preferably 1–2 equivalents per equivalent of the hydroxyl group present in the polyester-polyol (a).

The esterification reaction between the polyester-polyol (a) and the unsaturated carboxylic acid (b) can be carried out according to the conventional methods. The reaction can be carried out in the presence of the above-mentioned esterifying catalyst by adding a polymerization inhibitor (m) detailed later. The quantity of the polymerization inhibitor is usually 0.0001–0.1% by weight, preferably 0.001–0.05% by weight, and further preferably 0.001–0.01% by weight based on the unsaturated carboxylic acid (b). The reaction temperature is usually 50–300° C., preferably 80–250° C., and further preferably 100–200° C.; and the reaction time is usually 0.5–15 hours, preferably 1–10 hours, and further preferably 2–7 hours.

In a case where a polyester-polyol represented by the following general formula (4):

$$P^1(OH)_m \quad (4)$$

wherein $P^1$ represents a polyester chain formed by subjecting a polybasic carboxylic acid component containing polymerized fatty acid and/or polymerized fatty acid ester to a polycondensation reaction with a polyhydric alcohol and m represents an average number of hydroxyl groups per molecule represented by (hydroxyl value×weight-average molecular weight)/(56.1×1000) (the value of m is in the range of 2.0–20), is reacted with an unsaturated carboxylic acid represented by the following general formula (5):

$$R^6R^7C=CR^8-(CH_2)_n-COOH \quad (5)$$

wherein $R^6$ and $R^7$ represent hydrogen atom, alkyl group or alkenyl group, $R^8$ represents hydrogen atom or alkyl group and n is an integer of 1–6, the unsaturated polyester (i) preferably obtained according to the present invention is represented by the following general formula (6):

$$P^1[O-CO-(CH_2)_n-CR^8=C-(R^6R^7)_m] \quad (6)$$

In the formulas (4) and (6), $P^1$ represents a polyester chain obtained by subjecting a polybasic carboxylic acid component containing polymerized fatty acid and/or polymerized fatty acid ester to a polycondensation reaction with a polyhydric alcohol; m represents preferably 2.5–15, and further preferably 3.0–10.

In the formulas (5) and (6), $R^6$ and $R^7$ independently represents hydrogen atom, alkyl group or alkenyl group, and preferably hydrogen atom; $R^8$ represents hydrogen atom or alkyl group, preferably hydrogen atom or lower alkyl group, and further preferably hydrogen atom or methyl group; and n represents an integer of 1–6, and preferably 0.

As expressed in terms of "polystyrene-converted weight average molecular weight (Mw)" determined by gel permeation chromatography, molecular weight of the unsaturated polyester (i) of the present invention is 1,000–100,000, preferably 3,000–50,000, and further preferably 5,000–30,000. If molecular weight of the unsaturated polyester compound (i) is too low, flexibility is insufficient. If it is too high, the resin composition is inferior in curability.

Unsaturated Polyurethane (ii)

The unsaturated (poly)urethane (ii) of the present invention is an unsaturated urethane compound or an unsaturated (poly)urethane compound having at least two polymerizable carbon-carbon unsaturated bonds in the molecule, which can be obtained by subjecting a polybasic carboxylic acid component containing polymerized fatty acid and/or polymerized fatty acid ester to a polycondensation reaction with a polyhyric alcohol to prepare polyester-polyol (c), followed by reacting said polyester-polyol (c) with a polyisocyanate (d) and at least one active hydrogen-containing polymerizable unsaturated compound (e) selected from the group consisting of acrylic acid, methacrylic acid, acrylamide, methacrylamide, active hydrogen-containing acrylic esters, active hydrogen-containing methacrylic esters and active hydrogen-containing styrenes represented by the following general formula (8):

$$CH_2=CR^{10}O-B-X \quad (8)$$

wherein $R^{10}$ is hydrogen atom or alkyl group, B is phenylene group and X is hydroxyl group, amino group or carboxyl group.

As the concrete examples of the polyester-polyol (c), the same ones as mentioned in the paragraph of polyester-polyol (a) can be referred to.

As the polyisocyanate (d), those used in the conventional polyurethane syntheses can be used without any particular limitation. Examples of said polyisocyanate (d) include aliphatic polyisocyanates such as hexamethylene diisocyanate, 2,2,4-trimethylhexamethylene diisocyanate, lysine methyl ester diisocyanate, tetramethylene diisocyanate and the like; alicyclic polyisocyanates such as isophorone diisocyanate, 4,4'-dicyclohexylmethane diisocyanate and the like; aromatic polyisocyanates such as 2,4-tolylene diisocyanate, 2,6-tolylene diisocyanate, xylylene diisocyanate, 4,4'-diphenylmethane diisocyanate, naphthalene diisocyanate, triphenylmethane triisocyanate, tris(4-phenylisocyanato) thiophosphate and the like; and hydrogenated aromatic polyisocyanates such as hydrogenated 4,4'-diphenylmethane diisocyanate, hydrogenated tolylene diisocyanate, hydrogenated xylylene diisocyanate and the like. Of these polyisocyanates, alicyclic and aromatic polyisocyanates are preferable, and aromatic polyisocyanates are particularly preferable.

These polyisocyanates (d) may be used either alone or in combination of two or more. The quantity of the polyisocyanate is appropriately decided with consideration of hydroxyl value of polyester-polyol (c), the number of active hydrogen atoms in the active hydrogen-containing polymerizable unsaturated compound (e) and the sum of the number of hydroxyl groups and active hydrogen atoms in the [polyester-polyol (c) +active hydrogen-containing polymerizable unsaturated compound (e)]. Thus, the quantity of polyisocyanate (d) is usually 1.01–5, preferably 1.05–4, further preferably 1.1–3.5, and most preferably 1.2–2.5, as expressed in terms of the equivalent ratio of isocyanato group/hydroxyl group, the equivalent ratio of isocyanato group/active hydrogen, or equivalent ratio of isocyanato group/(hydroxyl group+active hydrogen).

Said active hydrogen-containing polymerizable unsaturated compound (e) is a compound having in the molecule thereof at least one active hydrogen atom reactive with isocyanate and at least one polymerizable unsaturated bond. As the active hydrogen, that of hydroxyl group, amino group, carboxyl group or the like can be referred to, and that of hydroxyl group is preferable. The polymerizable carbon-carbon unsaturated bond is that participating in polymerization reactions initiated by radiations, heat and various polymerization initiators, and its concrete examples include vinyl bond, vinylidene bond and the like.

Preferable examples of the above-mentioned active hydrogen-containing polymerizable unsaturated compound (e) include acrylic acid, methacrylic acid, acrylamide, methacrylamide, active hydrogen-containing acrylic esters, active hydrogen-containing methacrylic esters, active hydrogen-containing styrenes and the like, among which active hydrogen-containing (meth)acrylic esters and active hydrogen-containing styrenes are preferable, and active hydrogen-containing (meth)acrylic esters are most preferable.

Examples of the active hydrogen-containing (meth) acrylic ester include hydroxyl group-containing (meth) acrylic esters, carboxyl group-containing (meth)acrylic esters, amino group-containing (meth)acrylic esters, and the like, among which hydroxyl group-containing (meth)acrylic esters are preferable.

As the hydroxyl group-containing (meth)acrylic ester, for instance, the compounds represented by the following general formula (7):

$$CH_2=CR^9—C(=O)—O—(A)_p—H \qquad (7)$$

wherein $R^9$ represents hydrogen atom or methyl group, A represents alkyleneoxy group, and p represents an integer of 1–100, and (meth)acrylic esters of 3- or higher-hydric alcohols can be referred to. Of these compounds, the compounds represented by general formula (7) are preferable, and the compounds represented by general formula (7) wherein p=1 are particularly preferable.

In the general formula (7), A represents an alkyleneoxy group, of which examples include methyleneoxy, ethyleneoxy, propyleneoxy, isopropyleneoxy, butyleneoxy, isobutyleneoxy, sec-butyleneoxy, tert-butyleneoxy, pentamethyleneoxy, hexamethyleneoxy, isohexyleneoxy, octamethyleneoxy, dodecylmethylenoxy, tetradecylmethyleneoxy, pentadecylmethyleneoxy and the like. Among these groups, lower alkyleneoxy groups such as methyleneoxy, ethyleneoxy, propyleneoxy, isopropyleneoxy, butyleneoxy, isobutyleneoxy, sec-butyleneoxy, tert-butyleneoxy, pentamethyleneoxy, hexamethyleneoxy, isohexyleneoxy and the like are preferable, and straight-chained lower alkyleneoxy groups such as methyleneoxy, ethyleneoxy, propyleneoxy, butyleneoxy, pentamethyleneoxy, hexamethyleneoxy and the like are particularly preferable. In the formula, p denotes an integer of 1–100, preferably 1–50, further preferably 1–10, and most preferably 1.

Examples of the acrylic ester represented by general formula (7) wherein p is 1 include hydroxymethyl (meth)acrylate, 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, 6-hydroxyhexyl (meth)acrylate, 8-hydroxyoctyl (meth)acrylate, 2-hydroxylauryl (meth)acrylate and the like. Among them, preferable are hydroxymethyl (meth)acrylate, 2-hydroxyethyl (meth)acrylate, 2-hydroxypropyl (meth) acrylate, 3-hydroxy-propyl (meth)acrylate, 2-hydroxybutyl (meth)acrylate, 4-hydroxybutyl (meth)acrylate, 6-hydroxyhexyl (meth)acrylate and the like, and particularly preferable are 2-hydroxyethyl (meth)acrylate, 3-hydroxypropyl (meth)acrylate, 4-hydroxy-butyl (meth)acrylate, 6-hydroxyhexyl (meth)acrylate and the like.

Examples of the (meth)acrylic ester of general formula (7) wherein p is 2–100 include diethyleneglycol mono(meth)acrylate, triethylenegyclol mono(meth)acrylate, polyethyleneglycol mono(meth)acrylate, dipropyleneglycol mono (meth)acrylate, tripropyleneglycol (meth)acrylate, polypropyleneglycol (meth)acrylate and the like, among which preferable are diethyleneglycol mono(meth)acrylate, triethyleneglycol mono(meth)acrylate, dipropyleneglycol mono(meth)acrylate, tripropyleneglycol (meth)acrylate and the like.

Examples of the (meth)acrylic ester of tri- or higher-hydric alcohol include glycerin di(meth)acrylate, pentaerythritol di(meth)acrylate, pentaerythritol tri(meth)acrylate, trimethylolpropane di(meth)acrylate and the like, among which preferable are glycerin di(meth)acrylate, pentaerythritol tri(meth)acrylate, trimethylolpropane di(meth) acrylate and the like.

As the "other hydroxyl group-containing (meth)acrylic esters", alkoxy group- and hydroxyl group-containing (meth)acrylic esters such as 3-butoxy-2-hydroxypropyl (meth)acrylate and the like, modified acrylic esters such as stearic acid-modified pentaerythritol diacrylate and the like can be referred to.

The active hydrogen-containing styrenes are represented by the following general formula (8):

$$CH_2=CR^{10}—B—X \qquad (8)$$

wherein $R^{10}$ represents hydrogen atom or alkyl group, B represents phenylene group, and X represents hydroxyl, amino or carboxyl group and preferably hydroxyl group.

Concrete examples of such compounds include p-hydroxystyrene, p-carboxystyrene and the like.

The above-mentioned active hydrogen-containing polymerizable unsaturated compounds (e) may be used either alone or in combination of two or more compounds. The quantity of the compound (e) based on the isocyanato group-containing compound [(d) and/or (f)] is usually 0.5–3, preferably 0.8–2 and further preferably 1–1.5 as expressed in terms of the equivalent ratio of [isocyanato group/active hydrogen].

The unsaturated polyurethane (ii) of the present invention can be produced (1) by reacting the above-mentioned components (c), (d) and (e) simultaneously, or (2) by reacting the component (c) with the component (d) to prepare a (poly) urethane compound having a terminal isocyanato group (e, followed by reacting the terminal isocyanato group-containing (poly)urethane compound (f) thus obtained with an active hydrogen-containing polymerizable unsaturated compound (e), or (3) by reacting (d) with (e) to prepare a terminal isocyanato group-containing (poly)urethane compound (g), followed by reacting (g) thus obtained with a polyester-polyol (c) obtained by subjecting polymerized fatty acid- and/or polymerized fatty acid ester-containing polybasic carboxylic acid component and a polyhydric alcohol to a polycondensation reaction.

The above-mentioned reaction (1) which comprises reacting (c), (d) and (e) simultaneously is carried out by appropriately adjusting the quantities of the components so that the quantity of unreacted isocyanato group after completion of the reaction comes to usually 1% by mole or less, preferably 0.5% by mole or less and further preferably 0.1% by mole or less based on the quantity of isocyanato group before the reaction. Usually, the components are charged so that summed quantity of the hydroxyl group in component (c) and active hydrogen in component (e) becomes approximately equal to the quantity of isocyanato group in component (d). More concretely saying, the equivalent ratio of [isocyanato group/(hydroxyl group+active hydrogen)] is usually 0.5–3, preferably 0.7–2 and further preferably 0.9–1.1, and the equivalent ratio of [hydroxyl group/active hydrogen] is usually 0.2–5, preferably 0.5–2 and further preferably 0.9–1.1.

Although the reaction (1) can progress in the absence of catalyst, it is usually carried out in the presence of a catalyst such as tertiary amines (e.g. triethylamine, morpholine, piperazine and the like), or organic metal compounds such as dibutyltin dilaurate, dioctyltin acetate, monobutyltin oxide, stannous oleate, stannous salt of tall oil fatty acid, lead octanoate and the like. The quantity of the catalyst is usually 0.01–10% by weight, preferably 0.05–5% by weight and further preferably 0.1–1% by weight based on the sum of (c), (d) and (e). The reaction (1) is usually carried out in the absence of solvent, though a chemically inert solvent such as xylene, toluene, 2-ethoxyethyl acetate or the like may be used if desired. The reaction temperature is usually 0–200° C., preferably 30–50° C. and further preferably 50–120° C., and the reaction time is usually 0.5–5 hours, preferably 1–10 hours and further preferably 2–8 hours.

In the reaction (2), the first step for reacting (c) and (d) is carried out so that the reaction product, namely (poly) urethane compound (f), can retain an isocyanato group. Thus, the reaction is carried out at an isocyanato group/ hydroxyl group ratio (equivalent ratio) of usually 1 or more, preferably 1–5, further preferably 1.1–3, and most preferably 1.2–2. Although this reaction may be carried out in the absence of catalyst, it is usually carried out in the presence of the same tertiary amine catalyst or organic metal compound catalyst as in reaction (1). The quantity of the catalyst is usually 0.01–10% by weight, preferably 0.05–5% by weight and further preferably 0.1–1% by weight based on the sum of (c) and (d). The reaction temperature is usually 0–200° C., preferably 30–150° C. and further preferably 50–120° C.; and the reaction time is usually 0.5–15 hours, preferably 1–10 hours and further preferably 2–8 hours.

In the reaction (2), the second step for reacting (f) and (e) is carried out so that the reaction product, namely the unsaturated (poly)urethane (i), comes to have at least two polymerizable carbon-carbon unsaturated bonds, by appropriately adjusting the ratio between component (e) and component (c). As expressed in terms of equivalent ratio of [isocyanato group/active hydrogen], the ratio between the component (f) and the component (e) is usually 0.5–3, preferably 1–2 and further preferably 1–1.5. Although this reaction can progress in the absence of catalyst, it is usually carried out in the presence of the same tertiary amine catalyst or organic metal compound catalyst as in reaction (1). Quantity of the catalyst is usually 0.01–1% by weight and preferably 0.05–0.5% by weight based on the sum of (f) and (e).

The reaction temperature is usually 0–200° C., preferably 30–150C and further preferably 50–120° C.; and the reaction time is usually 0.5–15 hours, preferably 1–10 hours and further preferably 2–8 hours.

In the reaction (3), the first step for reacting (d) and (e) is carried out so that the reaction product, namely (poly) urethane compound (g), has an isocyanato group in the molecule thereof, by adjusting the equivalent ratio of [isocyanato group/active hydrogen] comes to usually 1 or more, preferably 1–5, further preferably 1–3 and most preferably 1–2. Although this reaction can be carried out in the absence of catalyst, it is usually carried out in the presence of the same tertiary amine catalyst or organic metal compound catalyst as in reaction (1). Quantity of the catalyst is usually 0.01–10% by weight, preferably 0.05–5% by weight and further preferably 0.1–1% by weight based on the sum of (d) and (e). The reaction temperature is usually 0–200° C., preferably 30–150° C. and further preferably 50–120° C.; and the reaction time is usually 0.5–15 hours, preferably 1–10 hours and further preferably 2–8 hours.

In the reaction (3), the second step for reacting (g) and (c) is carried out so that the reaction product, namely the unsaturated (poly)urethane (i) of the present invention, has at least two polymerizable carbon-carbon unsaturated bonds by appropriately adjusting the ratio of component (e) to component (c). As expressed in terms of equivalent ratio of [isocyanato group/hydroxyl group], the ratio between the component (g) to the component (c) is usually 0.5–3, preferably 1–2 and further preferably 1–1.5. Although the reaction can progress in the absence of catalyst, it is usually carried out in the present of the same tertiary amine catalyst or organic metal compound catalyst as in reaction (1). Quantity of the catalyst is usually 0.01–1% by weight, and preferably 0.05–0.5% by weight based on the sum of (g) and (c). The reaction temperature is usually 0–200° C., preferably 30–150° C. and further preferably 50–120° C.; and the reaction time is usually 0.5–15 hours, preferably 1–10 hours and further preferably 2–8 hours.

In the production methods (1), (2) and (3) mentioned above, a polymerization inhibitor is preferably added for preventing the polymerization of polymerizable carbon-carbon bonds. The polymerization inhibitor is not particularly limited, so far as it is conventionally used for preventing radical polymerization reactions. Examples of the polymerization inhibitor include t-butylhydroquinone, hydroquinone, 1,4-naphthoquinone, parabenzoquinone, toluhydroquinone, p-tert-butylcatechol, 2,6-tert-butyl-4-methylphenol and the like. These polymerization inhibitors are used in an amount of usually 0.00001–0.5% by weight, preferably 0.0001–0.1% by weight and further preferably 0.001–0.05% by weight based on compound (c).

In a case where the unsaturated (poly)urethane (ii) of the present invention is produced by reacting a polyester-polyol (c) represented by the following general formula (9):

$$HO-P^2-OH \tag{9}$$

wherein $P^2$ is a polyester chain obtained by subjecting a dibasic carboxylic acid containing a dimer acid and/or a dimer acid ester to a polycondensation reaction with a dihydric alcohol, with a divalent polyisocyanate (d) represented by the following general formula (10):

$$OCN-R^{11}-NCO \tag{10}$$

wherein $R^{11}$ is alkylene, cycloalkylene, cycloalkylenealkylene or arylene group, and a compound (e) represented by the aforementioned general formula (7) wherein p is 1, the unsaturated (poly)urethane (ii) can be represented by the following general formula (11):

$$CH_2=CR^9-COO-A-CONH-R^{11}-NHCOO-(P^2-OCONH-R^{11}-)_q-NHCO-A-OCO-CR^6=CH_2 \tag{11}$$

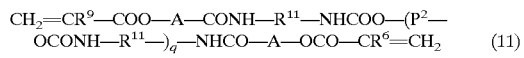

As concrete examples of $R^9$ and A in the general formula (11), the same ones as in the paragraphs of $R^9$ and A in general formula (7) can be referred to.

In general formula (11), $R^{11}$ represents alkylene, cycloalkylene, cycloalkylenealkylene or arylene group, among which preferable are cycloalkylenealkylene and arylene groups and further preferable is arylene group. As the alkylene group, methylene, ethylene, n-propylene, isopropylene, n-butylene, isobutylene, sec-butylene, tert-butylene, n-hexylene and the like can be referred to. As the cycloalkylene group, cyclopentylylene, cyclohexylylene and the like can be referred to. As the cycloalkylenealkylene group, cyclohexylenemethylene, cyclohexylethylene and the like can be referred to, which may optionally be substituted by 1 to 4 lower alkyl groups. As the arylene group, phenylene, biphenylene, tolylene, naphthalene group and the like can be referred to, which may optionally be substituted by 1 to 4 lower alkyl groups.

In the general formula (11), $P^2$ represents a polyester chain obtained by subjecting a dimer acid-containing dibasic carboxylic to a polycondensation with a dihydric alcohol, wherein q is an integer of 1–20, preferably 1–10, and further preferably 1–5. Molecular weight of the unsaturated (poly) urethane (ii) is 1,000–100,000, preferably 3,000–50,000 and further preferably 5,000–30,000 as calculated as weight-average molecular weight (Mw) of corresponding polystyrene measured by gel permeation chromatography (GPC). If molecular weight of the unsaturated (poly)urethane (ii) is excessively low, flexibility is not good. If the molecular weight is excessively high, water resistance is not good.

Curable Resin Composition

The curable resin composition of the present invention is characterized in that it comprises a polymerizable unsaturated compound (h) having at least two carbon-carbon unsaturated bonds in the molecule thereof and a diluent (j), and said polymerizable unsaturated compound (h) contains at least one polymerizable unsaturated compound selected from the group consisting of the above-mentioned unsaturated polyester (i) and the above-mentioned unsaturated (poly)urethane (ii). In the polymerizable unsaturated compound, the content of [unsaturated polyester (i)+ unsaturated (poly)urethane (ii)] is usually 50% by weight or more, preferably 70% by weight or more and further preferably 90% by weight or more based on the total polymerizable unsaturated compound (h).

The residual portion of the polymerizable unsaturated compound (h), namely the portion other than (i) and (ii), is not particularly limited, so far as it has at least two polymerizable carbon-carbon unsaturated bonds in the molecule thereof. Thus, those conventionally used in usual curable resin compositions can be used without restriction. Concrete examples thereof include urethane acrylate oligomer of polyether-polyol, urethane acrylate oligomer of other polyester-polyols, urethane acrylate oligomers having both ether group and ester group, urethane acrylate oligomer of carbonate-polyol, and the like. These polymerizable unsaturated compounds can be used either alone or in combination of two or more.

The diluent (j) is not particularly limited, so far as it is a diluent conventionally used in usual curable resin compositions. Monovinyl compounds and the like are used, for instance. Examples of said monovinyl compound include aliphatic vinyl, aromatic vinyl, heterocyclic vinyl, unsaturated alcohol ester, unsaturated ether, unsaturated carboxylic esters and the like, among which preferable are unsaturated carboxylic esters.

As the aliphatic vinyl, for instance, olefin compounds having a carbon-carbon double bond on their molecular terminal such as ethylene, propylene, 1-butene, 1-hexene, 3-methyl-1-butene, 3-methyl-1-pentene, 4-methyl-1-pentene, 1-octene, 1-nonene, 1-decene, 1-dodecene, 1-octadecene and the like can be referred to. Among them, higher olefins having a carbon-carbon double bond on the molecular terminal thereof such as 1-octene, 1-nonene, 1-decene, 1-dodecene, 1-octadecene and the like are preferable.

As the aromatic vinyl, for instance, styrene, a-methylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, monochloro-styrene, dichlorostyrene, monofluorostyrene and the like can be referred to. Among them, styrene is preferable.

As the heterocyclic vinyl, for instance, N-vinyl-2-pyrrolidone, N-vinylimidazoline, N-vinylcaprolactam and the like can be referred to.

The unsaturated alcohols used in the ester of unsaturated alcohol or in the unsaturated ether are those having usually 2–20, preferably 2–10 and further preferably 2–6 carbon atoms. Preferable examples thereof include vinyl alcohol, 1-methylvinyl alcohol, allyl alcohol, 10-undecen-1-ol, 1-octen-3-ol, 2-methanol-norbornene, p-hydroxystyrene and the like. Among them, vinyl alcohol, 1-methylvinyl alcohol and the like are particularly preferable.

Though the ester of unsaturated alcohol is not limited so far as it is an ester of the above-mentioned unsaturated alcohols, a saturated carboxylic acid ester of the unsaturated alcohol is usually used. As said saturated carboxylic acid, those having usually 1–20, preferably 1–10 and further preferably 1–6 carbon atoms are used. As said saturated carboxylic acid, formic acid, acetic acid, propionic acid, butyric acid, valeric acid, octanoic acid, lauric acid, stearic acid, eicosanoic acid and the like can be referred to, among which preferable are formic acid, acetic acid, propionic acid, butyric acid, valeric acid and the like. As preferable examples of the ester of unsaturated alcohol, vinyl formate, allyl formate, vinyl acetate, allyl acetate, vinyl propionate, allyl propionate, vinyl butyrate, allyl butyrate and the like can be referred to, among which most preferable are vinyl acetate, allyl acetate and the like.

As the unsaturated ether, any unsaturated ethers may be used so far as they are ether compounds of the above-mentioned unsaturated alcohols. Examples of said unsaturated ether include hydroxymethyl vinyl ether, 2-hydroxyethyl vinyl ether, hydroxymethyl propenyl ether, 2-hydroxyethyl isopropenyl ether and the like, among which preferable are hydroxymethyl vinyl ether, 2-hydroxyethyl vinyl ether and the like.

As the unsaturated carboxylic ester, ester compounds of acrylic acid and methacrylic acid are particularly preferable. Examples of such (meth)acrylic ester include alkyl (said alkyl may optionally have a substituent) esters, cycloalkyl (said cycloalkyl may have a substituent) esters, aryl (said aryl may optionally have a substituent) esters, aralkyl (said aralkyl may optionally have a substituent) esters, and the like of acrylic acid and methacrylic acid. Among them, the optionally substituted alkyl esters are preferable.

As the alkyl group having no substituent which constitutes the alkyl ester, methyl, ethyl, propyl, isopropyl, butyl, amyl, hexyl, heptyl, octyl, 2-ethylhexyl, nonyl, isononyl, sec-nonyl, 1-ethylheptyl, 1-propylhexyl, 1-butylamyl, isobornyl, octadecyl and the like can be referred to, among which higher alkyl groups such as octyl, 2-ethylhexyl, nonyl, isononyl, sec-nonyl, 1-ethylheptyl, 1-propylhexyl, 1-butylamyl, isobornyl, octadecyl and the like are preferable.

The substituent on the alkyl group is not particularly limited, so far as it does not affect the reaction of the invention. As examples of said substituent, hydroxyl group, alkoxy group, aryloxy group, alkylamino group, halogen atom and the like can be referred to, among which preferable are hydroxyl group, alkoxy group and aryloxy group. As the alkyl group having such a substituent, lower alkyl groups having such substituents are particularly preferable.

As the cycloalkyl group constituting the cycloalkyl ester, cyclopentyl, 2-methylcyclopentyl, cyclohexyl, 4-methylcyclohexyl and the like can be referred to.

As the aryl group constituting the aryl ester, phenyl and the like can be referred to.

As the aralkyl group constituting the aralkyl ester, benzyl, phenethyl and the like can be referred to. These cycloalkyl, aryl and aralkyl groups may have a substituent. As concrete examples of said substituent, the same ones as those on the above-mentioned alkyl group can be referred to in addition to alkyl groups.

Preferable examples of the (meth)acrylic ester include alkyl (meth)acrylates such as methyl (meth)acrylate, ethyl (meth)acrylate, n-propyl (meth)acrylate, isopropyl (meth)acrylate, n-butyl (meth)acrylate, hexyl (meth)acrylate, 2-ethylhexyl (meth)acrylate, l-ethylheptyl (meth)acrylate, nonyl (meth)acrylate, isononyl (meth)acrylate, 1-butylamyl (meth)acrylate, isobornyl (meth)acrylate, lauryl (meth)- acrylate, octadecyl (meth)acrylate and the like; hydroxyalkyl (meth)acrylates such as hydroxymethyl (meth)acrylate, 2-hydroxyethyl (meth)acrylate, 2-hydroxy-propyl (meth)acrylate, 3-hydroxypropyl (meth)acrylate, 2-hydroxybutyl (meth)acrylate, 4-hydroxybutyl (meth)acrylate, 6-hydroxyhexyl (meth)acrylate, 8-hydroxyoctyl (meth)acrylate, 2-hydroxylauryl (meth)acrylate and the like; oligo- or polyoxyalkyleneglycol (meth)acrylates such as diethyleneglycol mono(meth)acrylate, triethyleneglycol mono(meth)acrylate, polyethyleneglycol mono(meth) acrylate, dipropyleneglycol mono(meth)acrylate, trimethyleneglycol (meth)acrylate, polypropyleneglycol (meth) acrylate and the like; tri- or higher-hydric alcohol (meth) acrylates such as glycerin di(meth)acrylate, pentaerythritol di(meth)acrylate, pentaerythritol tri(meth)acrylate, trimethylolpropane di(meth)acrylate and the like; etc. Among these (meth)acrylates, alkyl (meth)acrylates and hydroxyalkyl (meth)acrylates are preferable, and higher alkyl (meth) acrylates such as 2-ethylhexyl (meth)acrylate, 1-ethylheptyl (meth)acrylate, nonyl (meth)acrylate, isononyl (meth) acrylate, 1-butylamyl (meth)acrylate, isobornyl (meth) acrylate, lauryl (meth)acrylate, octadecyl (meth)acrylate and the like and lower hydroxyalkyl (meth)acrylates such as hydroxymethyl (meth)acrylate, 2-hydroxyethyl (meth) acrylate, 2-hydroxypropyl (meth)acrylate, 3-hydroxypropyl (meth)acrylate, 2-hydroxybutyl (meth)-acrylate, 4-hydroxybutyl (meth)acrylate, 6-hydroxyhexyl (meth) acrylate and the like are especially preferable.

As the "other (meth)acrylic esters", 2-hydroxy-3-phenoxypropyl (meth)acrylate, 3-chloro-2-hydroxypropyl (meth)acrylate, 2-ethylhexylcarbitol (meth)acrylate and the like can be referred to.

The diluents (j) may be used either alone or in combination or two or more. The diluent (j) is used in an amount of usually 10–300 parts by weight, preferably 20–200 parts by weight and further preferably 30–150 parts by weight per 100 parts by weight of the polymerizable unsaturated compound (h).

The method for curing the curable resin composition of the present invention is not particularly limited, but the composition can be cured, for instance, by heat or by irradiation of active energy beams. Preferably, it is cured by irradiation of active energy beams. As used herein, the term "active energy beam" inclusively means ultraviolet ray and ionizing radiations such as electron beam, alpha ray, beta ray, gamma ray and the like. In case where an ultraviolet ray is used, it is preferable to add a photo-polymerization initiator (k) and/or a photosensitizer (m) to the curable resin composition of the invention. In cases where an ionizing radiation such as electron beam, gamma ray or the like is used, the curable resin composition of the invention can be cured rapidly without addition of any photopolymerization initiator or photosensitizer.

The photopolymerization initiator (k) is not particularly limited so far as it generates radicals when exposed to light and the radicals thus generated can effectively react with a polymerizable unsaturated compound. Known photopolymerization initiators can be used for this purpose.

The photopolymerization initiators (k) which can be used include benzoin alkyl ether compounds such as benzoin ethyl ether, benzoin isobutyl ether and the like; benzophenone compounds such as benzophenone, methyl o-benzoyl benzoate, 4,4'-dichlorobenzophenone and the like; benzyl compounds such as dibenzyl, benzyl dimethyl ketal and the like; acetophenone compounds such as 2,2-diethoxyacetophenone, 2-hydroxy-2-methylpropiophenone, 4-isopropyl-2-hydroxy-2-methylpropiophenone, 1,1-dichloroacetophenone, 2,2-diethoxy-acetophenone, 4'-phenoxy-2,2-dichloroacetophenone and the like; thioxanthone compounds such as 2-chlorothioxanthone, 2-methylthioxanthone, 2-isopropylthioxanthone and the like; anthraquinone compounds such as 2-ethylanthraquinone, 2-chloroanthraquinone, naphthoquinone and the like; propiophenone compounds such as 2-hydroxy-2-methylpropio-phenone, 4'-dodecyl-2-hydroxy-2-methylpropiophenone and the like; metallic salts of organic acids such as cobalt octenoate, cobalt naphthenate, manganese octenoate, manganese naphthenate and the like; peroxides such as methyl ethyl ketone peroxide, cyclohexanone peroxide, cumene hydroperoxide and the like; etc.

These photopolymerization initiators (k) may be used either alone or in combination of two or more species. The photopolymerization initiator (k) is used in an amount of usually 0.1–20 parts by weight, preferably 0.5–15 parts by weight and further preferably 1–10 parts by weight per 100 parts by weight of the polymerizable monomer component (h).

The photosensitizer (m) is not particularly limited so far as it can be used for usual photo-curable resin compositions. Examples thereof include aliphatic amines such as methylamine, tributylamine, n-methyldiethanolamine and the like; aromatic amines such as diphenylamine, tribenylamine and the like; sulfur compounds such as o-tolylthiourea, sodium diethyl dithiophosphate, S-benzylisothiuronium p-toluene-sulfonate and the like; nitriles such as N,N-disubstituted-p-aminobenzonitriles and the like; phosphorus compounds such as tri-n-butylphosphine and the like; and nitrosoamines such as N-nitrosohydroxylamine and the like.

These photosensitizers (m) may be used either alone or in combination or two or more species. Quantity of the photosensitizer (m) is appropriately decided in a range making no obstruction to the effect of the invention.

It is recommendable to add a polymerization inhibitor (n) to the curable resin composition of the present invention to prevent the progress of polymerization in the course of storage. The polymerization inhibitor (n) is not particularly limited so far as it can be used in the usual curable resin compositions. Examples thereof include t-butylhydroquinone, hydroquinone, 1,4-naphthoquinone, p-benzoquinone, toluhydroquinone, p-tert-butylcatechol, 2,6-tert-butyl-4-methylphenol and the like. These polymerization inhibitors (n) may be used either alone or in combination of two or more species. Quantity of the polymerization inhibitor (n) is usually 1–1,000 ppm, preferably 5–500 ppm, and further preferably 10–100 ppm based on the curable resin composition.

The curable resin composition of the present invention can be produced by blending the ingredients mentioned above according to the usual method. If desired, other compounding ingredients generally used in usual curable resin compositions may be added to the curable resin composition of the present invention. Examples of said "other ingredients" include the natural and synthetic polymeric compounds disclosed in JP-A-Hei 7-268046; the fiber-reinforcing materials disclosed in JP-A-Hei 7-268046; iron, chromium, nickel, cobalt, alloys thereof and oxides thereof; various stabilizers (antioxidants, weather stabilizers, heat stabilizers, etc.) such as phenyl-a-naphthylamine, phenyl-o-naphthylamine, N,N'-diphenyl-p-phenylenediamine, N,N'-diphenyl-ethylenediamine, N-cyclohexyl-N'-phenyl-p-phenylenediamine, N-octyl-N'- phenyl-p-phenylenediamine, p-isopropoxy-diphenylamine, di-o-tolylethylenediamine and the like; plasticizers such as dimethyl phthalate, diethyl phthalate, dihexyl phthalate, butyl lauryl phthalate, di(2-ethylhexyl) phthalate, dilauryl phthalate, di-2-octyl phthalate, di-n-butyl adipate, diisooctyl adipate, octyl decyl adipate, di-2-ethylhexyl 4-thioazeiate, diethyl sebacate, di-n-butyl maleate, diethyl maleate and the like; colorants including inorganic pigments such as titanium oxide, zinc oxide, basic lead carbonate, red lead oxide, cuprous oxide, black iron oxide, cadmium yellow, molybdenum red, silver vermilion, chrome yellow pigment, chromium oxide, iron blue pigment, carbon black, barium sulfate, alumina white, white carbon and the like and organic pigments; electrical conductivity-improver such as ferrite and the like; inorganic fillers such as calcium carbonate, calcium oxide, magnesium oxide, calcium hydroxide, magnesium hydroxide, aluminum hydroxide, magnesium carbonate, calcium silicate, magnesium silicate, calcium sulfate, barium sulfate, calcium sulfite, mica, dolomite, clay, talc, zinc oxide, glass fiber and the like; reinforcing materials such as silica, carbon black and the like; antistatic agents; nucleating agents; flame retardants; oils; etc.

These compounding ingredients may be used either alone or in combination of two or more species, and quantity thereof is appropriately decided in a range making no obstruction to the effect of the invention.

Molded Article

The molded article of the present invention can be produced by curing the curable resin composition mentioned above. The curing process may be carried out according to conventional method, for instance, by irradiating the above-mentioned radiations or by applying heat.

The method for producing a molded article according to the present invention is especially superior when a method of projecting an active energy beam is applied thereto, and ultraviolet irradiation gives the most excellent result. As the source of ultraviolet ray, xenon lamp, low pressure mercury lamp, high pressure mercury lamp, ultra-high pressure mercury lamp and the like can be referred to. As the atmosphere of the ultraviolet irradiation, an atmosphere of inert gases such as nitrogen gas, carbon dioxide gas and the like or an atmosphere having a lowered oxygen concentration are preferred, even though the curable resin composition of the present invention can be cured in the usual air atmosphere. Temperature of the atmosphere of the irradiation may be any of an ambient temperature and a positively elevated temperature where heat is applied to curing reaction of the curable resin composition. Usually, the curing can be effected in a temperature range of 10–200° C.

The molded product of the present invention is especially useful as a gasket such as the tight-closing gasket for casings of precision instruments such as magnetic hard disk drive unit (HDD) of electronic computers. Usually, these gaskets have a width of 1–3 mm as measured at the portion coming into contact with substrate and a height of about 0.5–1.5 mm as measured from the substrate surface, and the section thereof is roughly semicircular.

Such a gasket can be produced by forming a curable resin composition of the present invention into a necessary shape such as string or sheet, and then projecting an active energy beam thereto to promote the cure. It is also possible in the present invention to produce a gasket by discharging a curable resin composition of the present invention on a substrate made of, for instance, metal or synthetic resin by means of X-Y-Z-driving automatic coating robot and at the same time curing it by ultraviolet irradiation.

As compared with the prior methods in which a resin composition is formed into a sheet and then cut into a ring or a composition is subjected to a molding process and then to a deburring process, the gasket production using the curable resin composition of the present invention is advantageous in that a gasket can be formed from a much smaller quantity of material and no processing nor attachment of gasket is necessary.

Since the gasket thus obtained is quite excellent in air tightness and durability under high-temperature high-humidity conditions, it can be applied to a variety of uses to make the most of such characteristic features. As molded articles other than gasket, FRP molded articles, putty, cast materials, binder for use in adhesives and inks, sealing material, gel coat material, waterproofing material, lining material, flooring material and the like can be referred to.

Next, the present invention is explained in more detail by referring to examples. The invention is by no means limited by these examples. In the examples, parts and % are by weight, unless otherwise defined.

The physical properties were measured according to the following methods.

(1) Weight average molecular weight

Weight average molecular weight of polyester was measured by GPC method and calculated as that of standard polystyrene.

(2) Hydroxyl value

Hydroxyl value of polyester was measured according to the "Standard Method for Analyses and Tests of Oils and Fats, 2, 4, 9, 2-83", edited by Japan Oil Chemists' Society.

(3) Isocyanato group content

According to JIS K7301, a sample dissolved in dry toluene is reacted with an excessive quantity of di-n-butylamine solution, and the quantity of residual di-n-butylamine is determined by back titration using a standard solution of hydrochloric acid.

(4) Quantity of free tolylene diisocyanate (TDI)

According to JIS K7301, a sample is made into a solution by adding thereto liquid paraffin as a solvent and isoamyl benzoate as an azeotropic solvent. Then, by a vacuum distillation, the azeotropic solvent and free TDI are distilled out of the solution, the distilled free TDI is reacted with an excessive quantity of a di-n-butylamine solution, and the residual di-n-butylamine is back-titrated with a standard solution of hydrochloric acid.

(5) Flexibility

Shore hardness is measured according to JIS K6301. The result is expressed in terms of Sore hardness A. A smaller value of Shore hardness means a better flexibility.

(6) Heat resistance

A sample is allowed to stand in an oven kept at 105° C. for one hour, after which the rate of change in weight (%) is determined.

(7) Water resistance

A sample is allowed to stand in a thermostatted chamber kept at a temperature of 80° C. and a humidity of 80% for 400 hours, after which the rate of decrease in hardness (%) is determined.

(8) Adhesiveness

A photocurable resin composition sample is coated onto a polypropylene plate up to a thickness of 50 µm. A SUS 304 plate previously heated at 140° C. for 4 minutes is laid on the coated surface and pressed under a pressure of 0.5 kg/cm² for 10 seconds. After 12 hours at 80° C., dry peeling strength is measured at a tensile speed of 50 mm/min.

(9) Adhesive strength

A pushable scale is pressed against the lateral surface of a gasket bonded onto a metallic plate, so that the longer side of the tip surface (25 mm×9 mm) of headpiece pushes the lateral surface of sample in the just horizontal direction. By increasing the force gradually, the force at which the gasket is peeled off is read out by means of a gauge. When no peeling occurs at the full scale of the gauge (5 kgf), the adhesive strength is expressed by >5 kgf.

(10) Air-tightness

Figure 3:
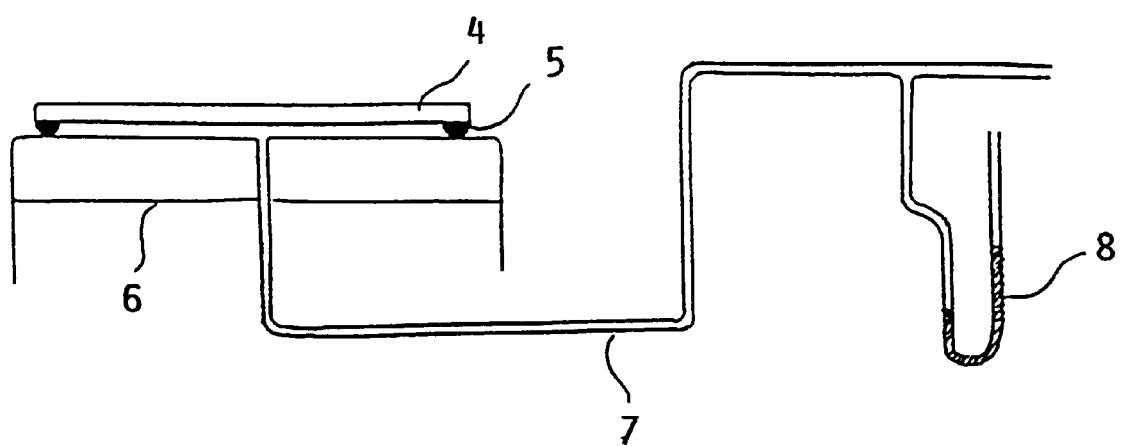
FIG. 3 is a diagram illustrating an air-tightness testing apparatus.

Using a testing apparatus shown in FIG. 3 placed in a thermostatted chamber kept at 25° C., air-tightness of a gasket sample is tested. On a testing stand 6, a metallic plate 4 bearing a gasket is placed so that gasket 5 looks downward, and is fixed to the stand by means of fixing jig (not shown in the drawing). Then, air is sent from air pipe 7 into the downside space of the metallic plate 4, and the air supply is closed when the air pressure has reached 30 mmH$_2$O. Ten minutes after, the manometer 8 is read. When the H$_2$O pressure is maintained unchanged, the air-tightness is evaluated as "Pass". When even a slight decrease in pressure is observed, the result is evaluated as "Reject".

(11) Durability

A metallic plate with a gasket looking upward is allowed to stand in an atmosphere having a temperature of 40° C. and relative humidity of 90% for 200 hours, after which the rate of increase in weight (%) is determined. Subsequently, the same sample as above is allowed to stand in a thermostatted chamber kept at a temperature of 25° C. for one hour, after which the air-tightness test mentioned above is repeated.

(12) Test on loss in weight upon heating

A gasket sample having a known weight is bonded to a metallic plate, and the whole is subjected to a thermo-balance test. The temperature is elevated from 25° C. to 60° C. at a rate of 10° C./minute. When the temperature has reached 60° C., the temperature is fixed at 60° C. After two hours has passed, the weight is measured, from which the rate of loss in weight per hour is calculated.

EXAMPLE 1

A 1,000 cc four-necked flask equipped with a stirrer, a thermometer, a reflux condenser, a water-separating tube and a nitrogen gas-inlet tube is charged with 300.0 g of a hydrogenated polymerized fatty acid (hydrogenated product of Haridimer 300; iodine value 6, acid value 195, monomer acid content 0.5%, dimer acid content 97.0%, trimer acid content 2.5%; manufactured by Harima Chemical Co., Ltd.), 87.7 g of 2-butyl-2-ethyl-1,3-propanediol, 27.7 g of 1,6-hexanediol and 0.26 g of monobutyltin oxide as a catalyst (OH/COOH equivalent ratio=1.50).

While introducing nitrogen gas, the content of the flask is stirred and the temperature is elevated up to 100° C. Subsequently, while distilling off the water formed by the reaction and the unreacted diols, the temperature is elevated from 100° C. to 240° C. in 6 hours. Then, while distilling off water, the reaction is continued at 240° C. for 8 hours. Further, the reaction is continued for an additional 2 hours at 240° C. under a reduced pressure of 100 mmHg. The polyester-polyol 1 thus formed has a weight-average molecular weight of 3,980, an acid value of 0.23, a hydroxyl value of 86.5 and a mean hydroxyl group number per molecule of 6.1.

Subsequently, a 1,000 cc four-necked flask equipped with a stirrer, a thermometer, a reflux condenser, a water-separating tube and a nitrogen gas inlet tube is charged with 200 g of the polyester-polyol 1 obtained above and 35 g of 2,4-tolylene diisocyanate. After adding 10 ppm of dibutyltin dilaurate as a catalyst, the content of the flask is made to react at 60° C. for 4 hours. After completion of the reaction, the hydroxyl value is 0.25 mgKOH/g and the NCO content is 1.78%. Then, 11.6 g of 2-hydroxyethyl acrylate, 40 ppm of t-butylhydroquinone as a polymerization inhibitor and 10 ppm of dibutyltin dilaurate as a catalyst are added, and the resulting mixture is made to react at 70° C. for 10 hours to form a polymerizable unsaturated (poly)urethane compound (A-i) having acryloyl group. The presence of the acryloyl group is confirmed from the existence of a conjugated absorption between C=C and C=O at a wavelength of 1600 cm$^{-1}$ in the infrared absorption spectrum. A-1 has a weight-average molecular weight of 17,800, and the quantity of residual isocyanate is 0.04% by weight.

EXAMPLE 2

A 1,000 cc four-necked flask equipped with a stirrer, a thermometer, a reflux condenser, a water-separating tube and a nitrogen gas-inlet tube is charged with 320.0 g of polymerized fatty acid (Haridimer 300; acid value 195, monomer acid content 0.5%, dimer acid content 97.0%, trimer acid content 2.5%; manufactured by Harima Chemical Co., Ltd.), 115.9 g of 2-butyl-2-ethyl-1,3-propanediol and 0.26 g of monobutyltin oxide as a catalyst (OH/COOH equivalent ratio=1.30).

While introducing nitrogen gas, the content of the flask is stirred and the temperature is elevated up to 100° C. Subsequently, while distilling off the water formed by the reaction and the unreacted diols, the temperature is elevated from 100° C. to 240° C. in 6 hours. Then, while distilling off water, the reaction is continued at 240° C. for 8 hours. Further, the reaction is continued for an additional 2 hours at 240° C. under a reduced pressure of 100 mmHg. The polyester-polyol 2 thus formed has a weight-average molecular weight of 6,300, an acid value of 0.3, a hydroxyl value of 41.4 and a mean hydroxyl group number per molecule of 4.6.

Subsequently, a 1,000 cc four-necked flask equipped with a stirrer, a thermometer, a reflux condenser, a water-separating tube and a nitrogen gas inlet tube is charged with 240 g of the polyester-polyol 2 obtained above and 30.8 g of 2,4-tolylene diisocyanate. After adding 10 ppm of dibutyltin dilaurate as a catalyst, the content of the flask is made to react at 60° C. for 4 hours. After completion of the reaction, the hydroxyl value is 0.15 mgKOH/g and the NCO content is 2.73%. Then, 23.0 parts of 2-hydroxypropyl acrylate, 40 ppm of t-butylhydroquinone as a polymerization inhibitor and 10 ppm of dibutyltin dilaurate as a catalyst are added, and the resulting mixture is made to react at 70° C. for 10 hours to form a polymerizable unsaturated (poly)urethane compound (A-2) having acryloyl group. A-2 has a weight-average molecular weight of 9,850, and the quantity of residual isocyanate is 0.02% by weight.

EXAMPLE 3

A 1,000 cc four-necked flask equipped with a stirrer, a thermometer, a reflux condenser, a water-separating tube and a nitrogen gas-inlet tube is charged with 315.4 g of a hydrogenated polymerized fatty acid (hydrogenated product of Haridimer 300; iodine value 6, acid value 195, monomer acid content 0.5%, dimer acid content 97.0%, trimer acid content 2.5%; manufactured by Harima Chemical Co., Ltd.), 86.8 g of 2,2-diethyl-1,3-propanediol and 0.26 g of monobutyltin oxide as a catalyst (OH/COOH equivalent ratio=1.20).

While introducing nitrogen gas, the content of the flask is stirred and the temperature is elevated up to 100° C. Subsequently, while distilling off the water formed by the reaction and the unreacted diols, the temperature is elevated from 100° C. to 240° C. in 6 hours. Then, while distilling off water, the reaction is continued at 240° C. for 8 hours. Further, the reaction is continued for an additional 2 hours at 240° C. under a reduced pressure of 100 mmHg. The polyester-polyol 3 thus formed has a weight-average molecular weight of 9,860, an acid value of 0.21, a hydroxyl value of 25.7 and a mean hydroxyl group number per molecule of 4.5.

Subsequently, a 1,000 cc four-necked flask equipped with a stirrer, a thermometer, a reflux condenser, a water-separating tube and a nitrogen gas inlet tube is charged with 300 g of the polyester-polyol 3 obtained above and 23.9 g of 2,4-tolylene diisocyanate. After adding 10 ppm of dibutyltin dilaurate as a catalyst, the content of the flask is made to react at 60° C. for 4 hours. After completion of the reaction, the hydroxyl value is 0.35 mgKOH/g and the NCO content is 0.89%. Then, 8 g of 2-hydroxyethyl acrylate, 40 ppm of t-butylhydroquinone as a polymerization inhibitor and 10 ppm of dibutyltin dilaurate as a catalyst are added, and the resulting mixture is made to react at 70° C. for 10 hours to form a polymerizable unsaturated (poly)urethane compound (A-3) having acryloyl group. A-3 has a weight-average molecular weight of 15,400, and the quantity of residual isocyanate is 0.05% by weight.

EXAMPLE 4

A 1,000 cc four-necked flask equipped with a stirrer, a thermometer, a reflux condenser, a water-separating tube and a nitrogen gas-inlet tube is charged with 300.0 g of polymerized fatty acid (Haridimer 300; acid value 195, monomer acid content 0.5%, dimer acid content 97.0%, trimer acid content 2.5%; manufactured by Harima Chemical Co., Ltd.), 38.1 g of terephthalic acid, 180.5 g of 2-butyl-2-ethyl-1,3-propanediol and 0.26 g of monobutyltin oxide as a catalyst (OH/COOH equivalent ratio=1.50).

While introducing nitrogen gas, the content of the flask is stirred and the temperature is elevated up to 100° C. Subsequently, while distilling off the water formed by the reaction and the unreacted diols, the temperature is elevated from 100° C. to 240° C. in 6 hours. Then, while distilling off water, the reaction is continued at 240° C. for 8 hours. Further, the reaction is continued for an additional 2 hours at 240° C. under a reduced pressure of 100 mmHg. The polyester-polyol 4 thus formed has a weight-average molecular weight of 3,660, an acid value of 0.35, a hydroxyl value of 89.8 and a mean hydroxyl group number per molecule of 5.9.

Subsequently, a 1,000 cc four-necked flask equipped with a stirrer, a thermometer, a reflux condenser, a water-separating tube and a nitrogen gas inlet tube is charged with 18.1 g of 2-hydroxyethyl acrylate and 40 ppm of t-butylhydroquinone as a polymerization initiator. After adding 54.3 g of 2,4-tolylene diisocyanate dropwise over a period of 2 hours while maintaining the reaction temperature at 70° C., the reaction mixture is further reacted for 15 hours. After completion of the reaction, the hydroxyl value is 0.09 mgKOH/g and the NCO content is 20.8%. Then, 300 g of the polyester-polyol 4 obtained above and 10 ppm of dibutyltin dilaurate as a catalyst are added and made to react at 60° C. for 4 hours to form a polyester type urethane acrylate (A-4) having acryloyl group. The urethane acrylate thus obtained has a weight-average molecular weight of 14,800, and the quantity of residual isocyanate is 0.03% by weight.

EXAMPLE 5

A 1,000 cc four-necked flask equipped with a stirrer, a thermometer, a reflux condenser, a water-separating tube and a nitrogen gas-inlet tube is charged with 503.3 9 of a hydrogenated polymerized fatty acid (hydrogenated product of Haridimer 300; iodine value 6, acid value 195, monomer acid content 0.5%, dimer acid content 97.0%, trimer acid content 2.5%; manufactured by Harima Chemical Co., Ltd.), 86.9 g of 1,6-hexanediol and 0.26 g of monobutyltin oxide as a catalyst (OH/COOH equivalent ratio=1.20).

While introducing nitrogen gas, the content of the flask is stirred and the temperature is elevated up to 100° C. Subsequently, while distilling off the water formed by the reaction and the unreacted diols, the temperature is elevated from 100° C. to 240° C. in 6 hours. Then, while distilling off water, the reaction is continued at 240° C. for 8 hours. Further, the reaction is continued for an additional 2 hours at 240° C. under a reduced pressure of 100 mmHg. The polyester-polyol 5 thus formed has a weight-average molecular weight of 5,120, an acid value of 0.3, a hydroxyl value of 63.5 and a mean hydroxyl group number per molecule of 5.8.

Subsequently, a 1,000 cc four-necked flask equipped with a stirrer, a thermometer, a reflux condenser, a water-separating tube and a nitrogen gas inlet tube is charged with 300 g of the polyester-polyol 5 obtained above and 44.3 g of 2,4-tolylene diisocyanate. After adding 10 ppm of dibutyltin dilaurate as a catalyst, the content of the flask is made to react at 60° C. for 4 hours. After completion of the reaction, the hydroxyl value is 0.19 mgKOH/g and the NCO content is 1.54%. Then, 14.7 g of 2-hydroxyethyl acrylate, 40 ppm of t-butylhydroquinone as a polymerization inhibitor and 10 ppm of dibutyltin dilaurate as a catalyst are added, and the resulting mixture is made to react at 70° C. for 10 hours to form a polymerizable unsaturated polyurethane compound (A-5) having acryloyl group.

A-5 has a weight-average molecular weight of 12,700, and the quantity of residual isocyanate is 0.02% by weight.

Referential Production Example 1

A 1,000 cc four-necked flask equipped with a stirrer, a thermometer, a water-separating tube and a nitrogen gas-inlet tube is charged with 73.1 g of adipic acid, 104.2 g of 2-butyl-2-ethyl-1,3-propanediol and 0.26 g of monobutyltin oxide as a catalyst (OH/COOH equivalent ratio=1.30).

While introducing nitrogen gas, the content of the flask is stirred and the temperature is elevated up to 100° C. Subsequently, while distilling off the water formed by the reaction and the unreacted diols, the temperature is elevated from 100° C. to 240° C. in 6 hours. Then, while distilling off water, the reaction is continued at 240° C. for 8 hours. Further, the reaction is continued for an additional 2 hours at 240° C. under a reduced pressure of 100 mmHg. The polyester-polyol 6 thus formed has a weight-average molecular weight of 4,700, an acid value of 0.1, a hydroxyl value of 57 and a mean hydroxyl group number per molecule of 4.8.

Subsequently, a 1,000 cc four-necked flask equipped with a stirrer, a thermometer, a reflux condenser, a water-separating tube and a nitrogen gas inlet tube is charged with 300 g of the polyester-polyol 6 obtained above and 53.0 g of 2,4-tolylene diisocyanate. After adding 10 ppm of dibutyltin dilaurate as a catalyst, the content of the flask is made to react at 60° C. for 4 hours. After completion of the reaction, the hydroxyl value is 0.35 mgKOH/g and the NCO content is 3.6%. Then, 35.4 parts of 2-hydroxyethyl acrylate, 40 ppm of t-butylhydroquinone as a polymerization inhibitor and 10 ppm of dibutyltin dilaurate as a catalyst are added, and the resulting mixture is made to react at 70° C. for 10 hours to form a polymerizable unsaturated polyurethane compound (B-1) having acryloyl group. B-1 has a weight-average molecular weight of 9,450, and the quantity of residual isocyanate is 0.04% by weight.

EXAMPLES 6–10

Referential Example 1

Seventy parts of one of the unsaturated polyesters (A-1) to (A-5) obtained in Examples 1–5 or the unsaturated polyester (B-1) obtained in Referential Example 1 is compounded and mixed with 15 parts of 4-hydroxybutyl acrylate, 35 parts of isobornyl acrylate, 10 parts of 2-ethylhexylcarbitol acrylate and 1 part of photopolymerization initiator (IRGACURE-184, manufactured by Ciba Geigy Ltd.). The compounded mixture is spread on a quartz glass plate, and covered with another quartz glass plate, provided that a spacer having a thickness of 2 mm is interposed between the two glass plates. An ultraviolet irradiation at a dose of 1,200 mj/cm$^2$ gives a cured sheet, which is subjected to various tests. The results are summarized in Table 1.

TABLE 1

|  | Example | | | | | Referential Example |
|---|---|---|---|---|---|---|
|  | 6 | 7 | 8 | 9 | 10 | 1 |
| Polymerizable unsaturated compound | A-1 | A-2 | A-3 | A-4 | A-5 | B-1 |
| Hardness Shore A | 40 | 38 | 37 | 41 | 40 | 49 |
| Heat resistance (%) | 0.17 | 0.26 | 0.13 | 0.23 | 0.21 | 0.20 |
| Water resistance (%) | 0.40 | 0.31 | 0.21 | 0.22 | 0.60 | 1.50 |
| Adhesive force (kg/cm$^2$) | 11.0 | 9.5 | 8.5 | 13.5 | 10.6 | 5.8 |

It is apparent from Table 1 that the photo-curable resin composition of the present invention containing an unsaturated polyester using a polyester-polyol obtained from polymerized fatty acid-containing polybasic carboxylic acid (Examples 1–5) are excellent in all of flexibility, heat resistance, water resistance and adhesive property.

It is also apparent that an additionally improved water resistance can be achieved by using a polyester-polyol in which a hindered glycol is used as the polyhydric alcohol component (Examples 1–4) and the effect is synergistic (as compared with Example 5 and Preferential Example 1).

EXAMPLE 11

A 1,000 cc four-necked flask equipped with a stirrer, a thermometer, a reflux condenser, a water-separating tube and a nitrogen gas-inlet tube is charged with 320 g of a polymerized fatty acid (Haridimer 300; acid value 195, monomer acid content 0.5%, dimer acid content 97.0%, trimer acid content 2.5%; manufactured by Harima Chemical Co., Ltd.), 115.9 g of 2-butyl-2-ethyl-1,3-propanediol and 0.26 g of monobutyltin oxide as a catalyst (OH/COOH equivalent ratio=1.30).

While introducing nitrogen gas, the content of the flask is stirred and the temperature is elevated up to 100° C. Subsequently, while distilling off the water formed by the reaction and the unreacted diols, the temperature is elevated from 100° C. to 240° C. in 6 hours. Then, while distilling off water, the reaction is continued at 240° C. for 8 hours. Further, the reaction is continued for an additional 2 hours at 240° C. under a reduced pressure of 100 mmHg. The polyester-polyol 7 thus formed has a weight-average molecular weight of 6,300, an acid value of 0.3, a hydroxyl value of 41.4 and a mean hydroxyl group number per molecule of 4.6.

Subsequently, a 1,000 cc four-necked flask equipped with a stirrer, a thermometer, a reflux condenser, a water-separating tube and a nitrogen gas inlet tube is charged with 300 g of the polyester-polyol 7 obtained above, 16.3 g of acrylic acid and 0.1 g of hydroquinone monomethyl ether as a polymerization initiator. The reaction mixture is reacted at 170–180° C. for 8 hours. Thus, there is obtained a polymerizable unsaturated polyester (C-1) having acryloyl group. (C-1) thus obtained has a weight-average molecular weight of 6,520 and a hydroxyl value of 0.4 mgKOH/g.

Referential Production Example 2

A 1,000 cc four-necked flask equipped with a stirrer, a thermometer, a reflux condenser, a water-separating tube and a nitrogen gas inlet tube is charged with 73.1 g of adipic acid, 104.2 g of 2-butyl-2-ethyl-1,3-propanediol and 0.26 g of monobutyltin oxide as a catalyst (OH/COOH equivalent ratio=1.30).

While introducing nitrogen gas, the content of the flask is stirred and the temperature is elevated up to 100° C. Subsequently, while distilling off the water formed by the reaction and the unreacted diol, the temperature is elevated from 100° C. to 240° C. in 6 hours. Then, while distilling off water, the reaction is continued at 240° C. for 8 hours. Further, the reaction is continued for an additional 2 hours at 240° C. under a reduced pressure of 100 mmHg. The polyester-polyol 8 thus obtained has a weight-average molecular weight of 3,540, an acid value of 0.1, a hydroxyl value of 57.3 and a mean hydroxyl group number per molecule of 3.6.

A 1,000 cc flour-necked flask equipped with a stirrer, a thermometer, a reflux condenser, a water-separating tube and a nitrogen gas inlet tube is charged with 300 g of the polyester-polyol 8 obtained above, 22.7 g of acrylic acid and 0.1 g of hydroquinoen monomethyl ether as a polymerization inhibitor, and the content of the flask is made to react at 170–180° C. for 8 hours to obtain a polymerizable unsaturated polyester (C-2) having acryloyl group. C-2 has a weight average molecular weight of 3,780 and a hydroxyl value of 0.6 mgKOH/g.

EXAMPLE 12

Comparative Example 1

Seventy parts of the unsaturated polyester (C-1) obtained in Example 11 or the unsaturated polyester (C-2) obtained in Comparative Example 1 is compounded and mixed with 80 parts of 4-hydroxybutyl acrylate, 22 parts of isononyl acrylate and photopolymerization initiators (0.3 part of IRGACURE-184 manufactured by Ciba Geigy Ltd. and 0.3 part of IRGACURE-651 manufactured by Ciba Geigy Ltd.). The compounded mixture is spread on a quartz glass plate, and covered with another quartz glass plate, provided that a spacer having a thickness of 2 mm is interposed between the two glass plates. An ultraviolet irradiation at a dose of 1,200 mj/cm² gives a cured sheet, which is subjected to various tests. The results are summarized in Table 2.

TABLE 2

|  | Example 12 | Comparative Example 1 |
|---|---|---|
| Polymerizable unsaturated compound | C-1 | C-2 |
| Hardness Shore A | 48 | 67 |
| Heat resistance (%) | 0.31 | 0.36 |
| Water resistance (%) | 0.20 | 1.68 |
| Adhesive force (kg/cm²) | 3.6 | 1.2 |

EXAMPLES 13–14

Comparative Examples 2–3

Flowable curable resin compositions are prepared by compounding various ingredients of which kinds and quantities are as shown in Table 3. A metallic plate for use as a dustproofing cover of magnetic hard disk drive unit having a longitudinal length of 102 mm and a lateral length of 146 mm is defatted. Using a coating robot equipped with an X-Y-Z-driving robot-controlling part 1 shown in FIG. 1, the curable resin composition mentioned above is supplied from dispenser 3 via tube 2 to coat the composition onto the defatted metallic plate in accordance with the shape of gasket to be formed, after which the coating resin composition is cured by ultraviolet irradiation at a dose of 1,000 mj/cm². FIG. 2 is a plan view illustrating the dustproofing cover thus formed. In FIG. 2, gasket 5 having a width of 2.0 mm as measured at the position contacted with the metallic plate and a height of 1.0 mm as measured from the level of metallic plate surface, is formed on the peripheral portions of the metallic plate 4. The curable resin composition is cured after being discharged, by the action of ultraviolet ray, and bonded to the metallic plate 4 through a roughly semicircular section. It is known that, according to the present invention, a gasket can be formed and simultaneously be set to a predetermined position so that the manufacturing process can be simplified and made high in efficiency. Results of various tests on the gasket thus produced are shown in Table 3.

TABLE 3

|  | Example | | Comparative Example | |
|---|---|---|---|---|
|  | 13 | 14 | 2 | 3 |
| Compounding ratio (parts) | | | | |
| A-1 (*1) | 70 | — | — | — |
| A-2 (*2) | — | 70 | — | — |
| B (*3) | — | — | 50 | 50 |
| SR506 (*4) | 35 | 35 | 25 | 25 |
| R128H (*5) | — | 15 | 25 | 25 |
| 4HBA (*6) | 15 | — | — | — |
| M120 (*7) | 10 | 10 | 30 | 15 |
| Photopolymerization initiator *8 | 1 | 1 | 1 | 1 |
| Hardness Shore A | 40 | 43 | 45 | 55 |
| Adhesive strength (kgf) | >5 | >5 | 0.3 | 0.2 |
| Air-tightness | Pass | Pass | Pass | Reject |
| Durability | | | | |
| Change in weight (%) | 0.8 | 0.5 | 1.5 | — |

TABLE 3-continued

|  | Example | | Comparative Example | |
|---|---|---|---|---|
|  | 13 | 14 | 2 | 3 |
| Air-tightness | Pass | Pass | Reject | — |
| Loss in weight upon heating (%) | 0.12 | 0.10 | 0.30 | — |

*1) Polymerizable unsaturated (poly)urethane compound produced in Example 1
(*2) Polymerizable unsaturated (poly)urethane compound produced in Example 2
(*3) Urethane-acrylate oligomer using a polyester-polyol derived from non-dimer acid (weight average mol. wt. 6,200, manufactured by Nippon Kayaku Co., trade name KAYARAD UX-3301)
(*4) Isobornyl acrylate
(*5) 3-Phenoxy-2-hydroxypropyl acrylate
(*6) 4-Hydroxybutyl acrylate
(*7) 2-Ethylhexylcarbitol acrylate
(*8) IRUGOCURE 184 (manufactured by Ciba Geigy Ltd.)

The results of Table 3 demonstrate that a gasket prepared by ultraviolet irradiation of the curable resin composition of the present invention has a sufficient air-tightness and a sufficient durability under high-temperature high-humidity condition. It is also understandable that the gasket shows a small loss in weight upon heating without losing any vaporized component, and therefore it is suitable for use in precision instruments.

On the other hand, a gasket prepared from prior polymerizable unsaturated (poly)urethane produced from a polyester-polyol using no polymerized fatty acid is inferior in adhesive strength and air-tightness when M-120 is used in a large amount (Comparative Example 2), and its hardness increases with loss of air-tightness when the amount of M-120 is lowered to the level comparable to that in Example 13 (Comparative Example 3).

INDUSTRIAL UTILIZABILITY

By putting the present invention into practice, there can be provided a polymerizable unsaturated compound and a curable resin composition containing said polymerizable unsaturated compound, both excellent in curability and at the same time in adhesive property, heat resistance, water resistance and flexibility.

By making an effective use of the above-mentioned properties, the curable resin composition of the present invention and a molded article prepared by curing said curable resin composition can be used as a FRP molding material, a putty, a cast product, a binder for adhesives and inks, a sealing material, a gasket, coating materials such as a gel coat material, and civil engineering and construction materials such as sealing material, water-proofing material, lining material, floor material, etc.

Figure 2:
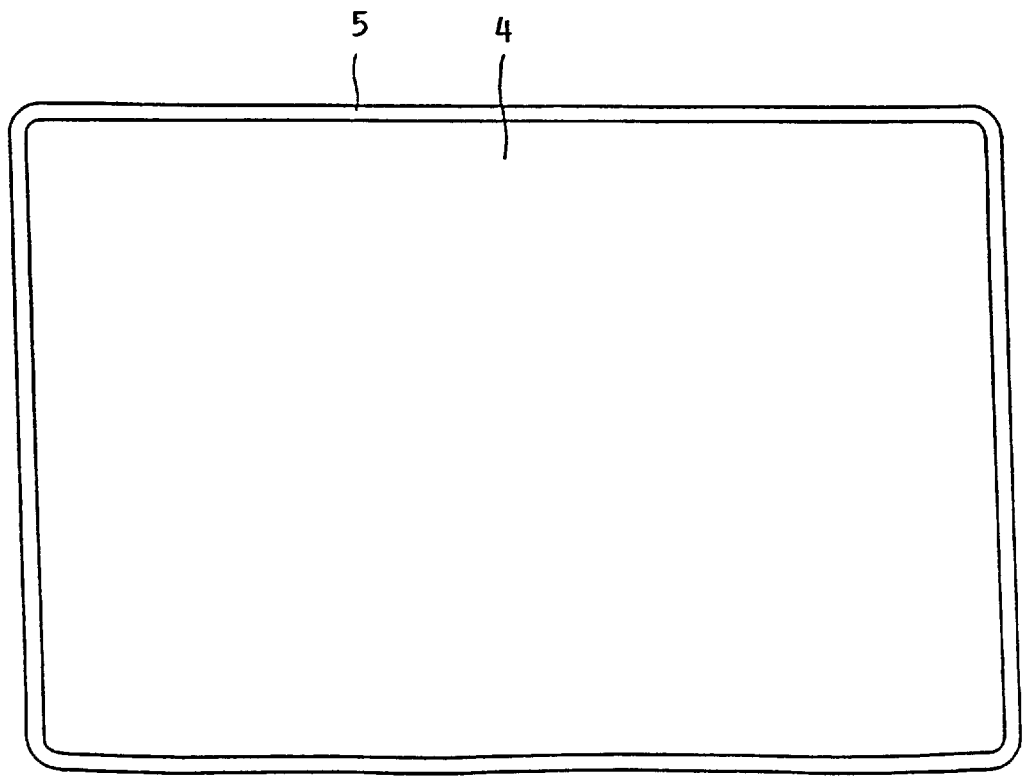
FIG. 2 is a plan view illustrating a dust cover produced in Examples 13 and 14.

Explanation of the number of FIGS. 1 to 3
1. Controlling part of X-Y-Z-driving automatic robot
2. Curable resin composition-supplying tube
3. Dispenser
4. Metallic plate
5. Gasket
6. Testing stand for air-tightness
7. Air-pipe
8. H₂O manometer

What is claimed is:
1. An unsaturated polyester (i) having a weight-average molecular weight of 1,000–100,000 and at least two polymerizable carbon-carbon unsaturated bonds in the molecule thereof, said unsaturated polyester (i) being obtained by subjecting a polybasic carboxylic acid component contain- ing at least one member selected from the group consisting of polymerized fatty acid and polymerized fatty acid ester to a polycondensation reaction with a polyhydric alcohol to form a polyester-polyol (a), followed by esterifying said polyester-polyol (a) with an unsaturated carboxylic acid (b) having a polymerizable unsaturated carbon-carbon bond in the molecule thereof.

2. The unsaturated polyester claimed in claim 1, wherein the quantity of the unsaturated carboxylic acid (b) is 0.8–5 equivalents per equivalent of the hydroxyl group in the polyester-polyol (a).

3. A method for producing an unsaturated polyester characterized by subjecting a polybasic carboxylic acid component containing at least one member selected from the group consisting of polymerized fatty acid and polymerized fatty acid ester to a polycondensation reaction with a polyhydric alcohol to form a polyester-polyol (a), followed by reacting said polyester-polyol (a) with an unsaturated carboxylic acid (b) having a polymerizable unsaturated carbon-carbon bond in the molecule thereof.

4. The method for producing an unsaturated polyester claimed in claim 3, wherein the quantity of the unsaturated carboxylic acid (b) is 0.8–5 equivalents per equivalent of the hydroxyl group in the polyester-polyol (a).

5. An unsaturated (poly)urethane (ii) having a weight-average molecular weight (Mw) of 1,000–100,000 and at least two polymerizable carbon-carbon unsaturated bonds in the molecule thereof; said unsaturated (poly)urethane (ii) being obtained by reacting a polyester-polyol (c), a polyisocyanate (d) and at least one active hydrogen-containing polymerizable unsaturated compound (e) selected from the group consisting of acrylic acid, methacrylic acid, acrylamide, methacrylamide, active hydrogen-containing acrylic esters, active hydrogen-containing methacrylic esters and active hydrogen-containing styrenes represented by the following general formula (8):

$$CH_2=CR^{10}-B-X \qquad (8)$$

wherein $R^{10}$ is hydrogen atom or alkyl group, B is phenylene group and X is hydroxyl group, amino group or carboxyl group; and said polyester-polyol (c) being obtained by subjecting a polybasic carboxylic acid component containing at least one member selected from the group consisting of polymerized fatty acid and polymerized fatty acid ester to a polycondensation reaction with a polyhydric alcohol.

6. The unsaturated (poly)urethane (ii) claimed in claim 5, wherein the quantities of the polyester-polyol (c), the polyisocyanate (d) and the active hydrogen-containing unsaturated compound (e) are in the ranges defined by an equivalent ratio [isocyanato group in (d)/active hydrogen in (e)] of 0.5–3 and an equivalent ratio [hydroxyl group in (c)/active hydrogen in (e)] of 0.2–5.

7. A method for producing the unsaturated (poly)urethane (ii) claimed in claim 5, characterized by reacting a polyester-polyol (c), a polyisocyanate (d) and at least one active hydrogen-containing polymerizable unsaturated compound (e) selected from the group consisting of acrylic acid, methacrylic acid, acrylamide, methacrylamide, active hydrogen-containing acrylic esters, active hydrogen-containing methacrylic esters and active hydrogen-containing styrenes represented by the following general formula (8):

$$CH_2=CR^{10}-B-X \qquad (8)$$

wherein $R^{10}$ is hydrogen atom or alkyl group, B is phenylene group and X is hydroxyl group, amino group or carboxyl group; said polyester-polyol (c) being obtained by subjecting a polybasic carboxylic acid component containing at least one member selected from the group consisting of polymerized fatty acid and polymerized fatty acid ester to a polycondensation reaction with a polyhydric alcohol.

8. The method claimed in claim 7, wherein the quantities of the polyester-polyol (c), the polyisocyanate (d) and the active hydrogen-containing unsaturated compound (e) are in the ranges defined by an equivalent ratio [isocyanato group in (d)/active hydrogen in (e)] of 0.5–3 and an equivalent ratio [hydroxyl group in (c)/active hydrogen in (e)] of 0.2–5.

9. A method for producing the unsaturated (poly)urethane (ii) claimed in claim 5, characterized by subjecting a polyhydric carboxylic acid component containing at least one member selected from the group consisting of polymerized fatty acid and polymerized fatty acid ester to a polycondensation reaction with a polyhydric alcohol to obtain a polyester-polyol (c), followed by reacting the polyester-polyol (c) with a polyisocyanate (d) to produce a (poly)urethane compound (f) having at least two isocyanato groups, and then reacting the isocyanato group-containing (poly)urethane compound (f) with at least one active hydrogen-containing polymerizable unsaturated compound (e) selected from the group consisting of acrylic acid, methacrylic acid, acrylamide, methacrylamide, active hydrogen-containing acrylic esters, active hydrogen-containing methacrylic esters and active hydrogen-containing styrenes represented by the following general formula (8):

$$CH_2=CR^{10}-B-X \qquad (8)$$

wherein $R^{10}$ is hydrogen atom or alkyl group, B is phenylene group and X is hydroxyl group, amino group or carboxyl group.

10. The method claimed in claim 9, wherein the quantities of components (c), (d), (e) and (f) are in the ranges defined by an equivalent ratio [isocyanato group in (d)/hydroxyl group in (c)] of 1 or more and an equivalent ratio [isocyanato group in (f)/active hydrogen in (e)] of 0.5–3.

11. A method for producing the unsaturated (poly)urethane (ii) claimed in claim 5, characterized by reacting a polyisocyanate (d) with at least one active hydrogen-containing polymerizable unsaturated compound (e) selected from the group consisting of acrylic acid, methacrylic acid, acrylamide, methacrylamide, active hydrogen-containing acrylic esters, active hydrogen-containing methacrylic esters and active hydrogen-containing styrenes represented by the following general formula (8):

$$CH_2=CR^{10}-B-X \qquad (8)$$

wherein $R^{10}$ is hydrogen atom or alkyl group, B is phenylene group and X is hydroxyl group, amino group or carboxyl group, to obtain an isocyanato group-containing (poly)urethane (g), followed by reacting the isocyanato group-containing (poly)urethane compound (g) with a polyester-polyol (c) obtained by subjecting a polybasic carboxylic acid component containing at least one member selected from the group consisting of polymerized fatty acid and polymerized fatty acid ester to a polycondensation reaction with a polyhydric alcohol.

12. The method claimed in claim 11, wherein the quantities of components (d), (e), (c) and (g) are in the ranges defined by an equivalent ratio [isocyanato group in (d)/active hydrogen in (e)] of 1 or more and an equivalent ratio [isocyanato group in (g)/hydroxyl group in (c)] of 0.5–3.

13. A curable resin composition comprising a polymerizable unsaturated compound (h) having at least two polymerizable carbon-carbon unsaturated bonds in the molecule thereof and a diluent (j), said polymerizable unsaturated compound being at least one member selected from the group consisting of an unsaturated polyester (i) having a weight-average molecular weight of 1,000–100,000 and at least two polymerizable carbon-carbon unsaturated bonds in the molecule thereof, said unsaturated polyester (i) being obtained by subjecting a polybasic carboxylic acid component containing at least one member selected from the group consisting of polymerized fatty acid and polymerized fatty acid ester to a polycondensation reaction with a polyhydric alcohol to form a polyester-polyol (a), followed by esterifying said polyester-polyol (a) with an unsaturated carboxylic acid (b) having a polymerizable unsaturated carbon-carbon bond in the molecule thereof and the (poly)urethane (ii) claimed in claim 5.

14. The curable resin composition claimed in claim 13, which additionally contains a photopolymerization initiator (k).

15. A molded article obtained by curing the curable resin composition according to claim 13.

16. The molded article claimed in claim 15, wherein said molded article is a gasket.

17. A method for producing a molded article comprising by curing the curable resin composition claimed in claim 13.

18. A molded article obtained by curing the curable composition according to claim 14.

19. A method for producing a molded article comprising curing a curable resin composition according to claim 14.

* * * * *